(12) United States Patent
Thiele et al.

(10) Patent No.: US 8,053,512 B2
(45) Date of Patent: Nov. 8, 2011

(54) SULFIDE MODIFIED ELASTOMERIC POLYMERS

(75) Inventors: Sven K. H. Thiele, Halle (DE); Joachim Kiesekamp, Schkopau (DE)

(73) Assignee: Styron Europe GmbH, Horgen (CH)

( * ) Notice: Subject to any disclaimer, the term of this patent is extended or adjusted under 35 U.S.C. 154(b) by 209 days.

(21) Appl. No.: 12/519,587

(22) PCT Filed: Dec. 14, 2007

(86) PCT No.: PCT/US2007/087564
§ 371 (c)(1),
(2), (4) Date: Jun. 17, 2009

(87) PCT Pub. No.: WO2008/076875
PCT Pub. Date: Jun. 26, 2008

(65) Prior Publication Data
US 2010/0069568 A1 Mar. 18, 2010

Related U.S. Application Data

(60) Provisional application No. 60/876,070, filed on Dec. 19, 2006.

(51) Int. Cl.
*B60C 1/00* (2006.01)
*C08L 9/00* (2006.01)
*C08L 9/02* (2006.01)
*C08L 9/06* (2006.01)
*C08L 47/00* (2006.01)

(52) U.S. Cl. ............ 524/571; 524/155; 524/82; 524/83; 524/86; 524/107; 524/330; 524/331; 524/418; 524/419; 524/500; 524/502; 524/505; 524/543; 524/565; 524/573; 524/576; 525/11; 525/23; 525/343; 525/241; 525/233

(58) Field of Classification Search .................. 524/571, 524/155, 82, 83, 86, 107, 330, 331, 418, 524/419, 500, 502, 505, 543, 565, 573, 576; 525/11, 23, 343, 241, 233
See application file for complete search history.

(56) References Cited

U.S. PATENT DOCUMENTS

| | | | |
|---|---|---|---|
| 2,964,502 A | 12/1960 | Wheelock | |
| 3,078,254 A | 2/1963 | Zelinski et al. | |
| 3,244,664 A | 4/1966 | Zelinski et al. | |
| 3,281,383 A | 10/1966 | Zelinski et al. | |
| 3,338,810 A | 8/1967 | Warner | |
| 3,350,345 A | 10/1967 | Vanderbilt et al. | |
| 3,629,213 A | 12/1971 | Onishi et al. | |
| 3,692,874 A | 9/1972 | Farrar et al. | |
| 3,706,806 A * | 12/1972 | Esclamadon et al. | ........... 568/62 |
| 3,869,435 A | 3/1975 | Trivette, Jr. | |
| 3,876,723 A | 4/1975 | Strecker | |
| 3,951,936 A | 4/1976 | Hanlon | |
| 3,978,103 A | 8/1976 | Meyer-Simon et al. | |
| 4,002,594 A | 1/1977 | Fetterman | |
| 4,048,206 A | 9/1977 | Voronkov et al. | |
| 4,474,908 A | 10/1984 | Wagner | |
| 4,544,711 A | 10/1985 | Mancinelli | |
| 4,616,069 A | 10/1986 | Watanabe et al. | |
| 4,689,368 A | 8/1987 | Jenkins | |
| 4,839,434 A | 6/1989 | Bronstert et al. | |
| 4,931,376 A | 6/1990 | Ikematsu et al. | |
| 5,086,136 A | 2/1992 | Takashima et al. | |
| 5,089,574 A | 2/1992 | Castner | |
| 5,134,199 A | 7/1992 | Hattori et al. | |
| 5,448,002 A | 9/1995 | Castner | |
| 5,753,579 A | 5/1998 | Jalics et al. | |
| 5,753,761 A | 5/1998 | Sandstrom et al. | |
| 5,834,573 A | 11/1998 | Castner | |
| 5,981,667 A | 11/1999 | Asakura et al. | |
| 6,018,007 A | 1/2000 | Lynch | |

(Continued)

FOREIGN PATENT DOCUMENTS

| | | |
|---|---|---|
| DE | 191 0177 | 9/1970 |
| EP | 0 778 291 A1 | 6/1997 |
| EP | 0 841 375 A1 | 5/1998 |
| EP | 0 924 214 A2 | 6/1999 |
| EP | 0 964 008 A1 | 12/1999 |
| EP | 1 191 056 A1 | 3/2002 |
| EP | 1 367 069 A1 | 12/2003 |
| JP | 06057041 | 3/1994 |
| JP | 2001-122919 | 5/2001 |
| WO | WO 02/50128 A1 | 6/2002 |
| WO | WO 03/097734 A1 | 11/2003 |

OTHER PUBLICATIONS

International Search Report mailed Apr. 18, 2008 for corresponding PCT Application No. PCT/US2007/087564.

(Continued)

*Primary Examiner* — James J Seidleck
*Assistant Examiner* — Deve E Valdez
(74) *Attorney, Agent, or Firm* — Brinks Hofer Gilson & Lione

(57) ABSTRACT

A backbone modified polymer comprising the reaction product of an elastomeric polymer and a sulfide modifier represented by Formula 1: AS—Y-Zm (Formula 1), and wherein Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$alkyl, ($C_1$-$C_4$alkoxy, ($C_7$-$C_{16}$aryl, ($C_7$-$C_{16}$ aralkyl, nitrile, amine, $NO_2$, alkoxy, or thioalkyl; S is sulfur; A is hydrogen, —(S)$_p$—R1 or -MR2R3R4; Z is —SH, —S-MR5R6R7, —S—(S)$_p$—R8, —NR9R10, —NR11COR12, —O—CO—R13, —NCO, or —COOR14; M is silicon or tin; N is nitrogen; O is oxygen; m is the number one, two or three; p is the number one, two, three, four or five; R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl. The invention also provides related compositions, methods and articles.

20 Claims, No Drawings

U.S. PATENT DOCUMENTS

| | | | |
|---|---|---|---|
| 6,079,468 | A | 6/2000 | D'Sidocky et al. |
| 6,103,842 | A | 8/2000 | Halasa et al. |
| 6,140,393 | A | 10/2000 | Bomal et al. |
| 6,184,168 | B1 | 2/2001 | Lynch |
| 6,229,036 | B1 | 5/2001 | Batz-Sohn et al. |
| 6,310,152 | B1 | 10/2001 | Castner |
| 6,403,720 | B1 | 6/2002 | Chino et al. |
| 6,489,415 | B2 | 12/2002 | Hsu et al. |
| 6,579,949 | B1 | 6/2003 | Hergenrother et al. |
| 6,617,406 | B2 | 9/2003 | Castner |
| 6,627,715 | B2 | 9/2003 | Halasa et al. |
| 6,664,328 | B1 | 12/2003 | Rodewald et al. |
| 6,693,160 | B1 | 2/2004 | Halasa et al. |
| 6,696,523 | B1 | 2/2004 | Scholl et al. |
| 6,777,569 | B1 | 8/2004 | Westmeyer et al. |
| 6,790,721 | B2 | 9/2004 | Hurley |
| 6,933,358 | B2 | 8/2005 | Halasa et al. |
| 7,041,761 | B2 | 5/2006 | Halasa et al. |
| 7,351,759 | B2 | 4/2008 | Araujo-Da-Silva et al. |
| 2003/0065114 | A1 | 4/2003 | Castner |
| 2005/0019290 | A1* | 1/2005 | Philippe et al. ............... 424/70.5 |
| 2005/0124740 | A1 | 6/2005 | Klockmann et al. |
| 2005/0159513 | A1 | 7/2005 | Henning et al. |
| 2008/0287601 | A1 | 11/2008 | Thiele et al. |

OTHER PUBLICATIONS

International Preliminary Report on Patentability and Written Opinion of the International Searching Authority issued Jun. 23, 2009 for corresponding PCT Application No. PCT/US2007/087564.

Database Registry, Aug. 12, 2005, XP002475606.

Database Registry, Mar. 20, 2003, "RN 500103-19-5" XP002475607.

Greene et al., "Protection For the Thiol Group," Protective Groups in Organic Synthesis, $3^{rd}$ Ed. pp. 482, 487-488, John Wiley & Sons, Inc., 1999.

Hull et al., "Sulfur Bond in Vulcanizates," Journal of Industrial and Engineering Chemistry, The Ohio State University, 40, pp. 513-517, (1948).

Lebedev et al., "Morphologische Besonderheiten Polymerer Mehrkomponentensysteme auf der Basis von Dithiolen and Diisocyanaten," Acta Polymerica 30, VCH, Weinheim, Germany, vol. 30, No. 8, Aug. 1978, pp. 496-502, XP009098448 ISSN: 0323-7648.

Rapoport et al., "A Series of $\omega$-Alkylmercapto and $\omega$-Alkylsulfonyl Acids," Journal of the American Chemical Society, 69(3), pp. 693-694 (Mar. 1947).

Strecker, R.A.H., "Vulcanization of Liquid Polydienes With Dithiols and Peroxides," Rubber Chemistry and Technology, 44/3, pp. 675-689, (1971).

Takenata et al., "Synthesis of End-Functionalized Polymer by Means of Living Anionic Polymerization, $5^a$,"Journal of Macromolecular Chemistry and Physics, vol. 197, pp. 3135-3148, 1996.

Tanaka et al., "Determination of Sequence Length Distribution in SBR by Ozonolysis-g.p.c. Method," Polymer, vol. 22, pp. 1721-1723 (Dec. 1981).

* cited by examiner

SULFIDE MODIFIED ELASTOMERIC POLYMERS

REFERENCE TO RELATED APPLICATIONS

The present application claims the benefit of U.S. Provisional Application No. 60/876,070, filed on Dec. 19, 2006.

FIELD OF THE INVENTION

This invention generally relates to uncrosslinked elastomeric polymers blended with "backbone modifiers," their use in the preparation of elastomeric compositions and articles made therefrom. The invention specifically relates to the use of so called "sulfides" as backbone modifiers for uncrosslinked elastomeric and cross-linked elastomeric polymers. The "backbone modifier" is reactable with the unsaturated portions of the elastomeric polymer backbone and/or with fillers or other components present in an elastomeric polymer composition. The modified uncrosslinked elastomeric polymers are useful in the preparation of vulcanized and thus cross-linked elastomeric compositions having relatively low hysteresis loss. Such compositions are useful in many articles including tire treads having low rolling resistance along with a good balance of other desirable physical and chemical properties, for example, wet skid properties, abrasion resistance, and tensile strength. The compounds comprising uncrosslinked elastomeric polymers have a balanced processability.

BACKGROUND OF THE INVENTION

It is generally accepted, that increasing oil prices force tire and rubber producers to contribute to the production of "fuel efficient" and thus fuel or gas saving tires. One general approach to obtain less fuel consuming tires consists in the reduction of the hysteresis loss. The hysteresis loss of a cross-linked elastomeric polymer composition is related to its Tan δ value at 60° C. (see ISO 4664-1:2005; Rubber, Vulcanized or thermoplastic; Determination of dynamic properties—part 1: General guidance). In general, vulcanized elastomeric polymer compositions having relatively small Tan δ values at 60° C. are preferred as having lower hysteresis loss. In tires, this translates to a lower rolling resistance and better fuel economy. One method to reducing hysteresis loss is to modify chain ends of uncrosslinked elastomeric polymers. Various techniques are described in the open literature including the use of "coupling agents" such as tin tetrachloride, which may functionalize the polymer chain end, and react with components of an elastomeric composition, such as for example with a filler. Examples of such techniques along with other documents of interest include: U.S. Pat. Nos. 3,281,383; 3,244,664 and 3,692,874 (for example tetrachlorosilane); U.S. Pat. Nos. 3,978,103; 4,048,206; 4,474,908; 6,777,569 (blocked mercaptosilanes) and U.S. Pat. No. 3,078,254 (a multi-halogen-substituted hydrocarbon such as 1,3,5-tri (bromo methyl)benzene); U.S. Pat. No. 4,616,069 (tin compound and organic amino or amine compound) and U.S. Publication 2005/0124740.

"Synthesis of end-functionalized polymer by means of living anionic polymerization" Journal of Macromolecular Chemistry and Physics 197 (1996), 3135-3148, describes the synthesis of polystyrene-containing and polyisoprene-containing living polymers with hydroxy (—OH) and mercapto (—SH) functional end caps, obtained by reacting the living polymer with haloalkanes containing silyl ether and silyl thioether functions. The tertiary-butyldimethylsilyl (TBDMS) group is preferred as protecting group for the —OH and —SH functions in the termination reactions, because the corresponding silyl ethers and thioethers are found to be both, stable and compatible with anionic living polymers.

Another method of reducing the hysteresis loss consists in a statistical backbone functionalization of polydienes. The number of functionalized positions along the rubber backbone can be higher compared with chain-end modification, where just one or two positions of one base polymer chain can be modified. Accordingly the interaction of the polymer chain with filler particles can be more intense in case of a backbone modification, when multiple (more than two) polymer backbone positions are modified. Thus, backbone functionalized polydienes have a potential for a lower hysteresis loss and a better compatibility with fillers, such as with carbon black and silica.

Examples for backbone modification of polymers.

Some typical examples for a polymer backbone modification were reported.

The Examples of such technique include:
(1) U.S. Pat. No. 6,933,358, and
(2) U.S. Pat. No. 7,041,761.

Polydienes prepared by using an anionic polymerization technology are usually made from butadiene, isoprene, and optionally styrene, as monomer sources. Functionalized conjugated diene or vinylaromatic monomers can be incorporated into the growing polymer chain, when interactions of the functional group with the initiator compound, often represented by n-butyllithium or sec-butyllithium, are avoided. Functionalized monomers, representing substituted styrene (1, 2) are shown below.

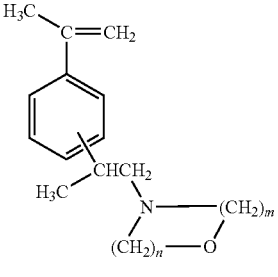

Ref. (1)

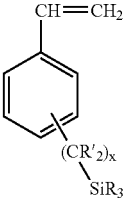

Ref. (2)

In the above structures, (R and R' are hydrogen or an alkyl group; x is the number 1 to 10; m and n are the numbers 0 to 10). Functionalized monomers representing, substituted isoprene (1) are shown below.

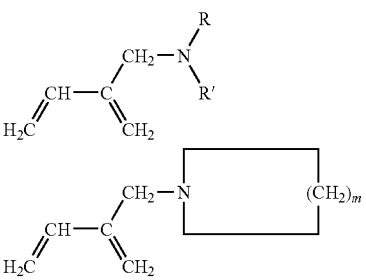

The substituted styrene and substituted isoprene structures, as shown above, were incorporated into the elastomeric polydiolefin by being copolymerized with unfunctionalized conjugated diolefin, and optionally vinyl aromatic monomers. The functionalized polymers improved the compatibility of the rubber in tires with fillers, such as carbon black and silica. In particular, tire rolling resistance properties, and therefore hysteresis properties of tires were stated to be improved. For example 0.25, 1, 2 and 5 weight percentage of 4-(2-pyrrolidinoethyl)styrene (PES) or 3-(pyrrolidino-methyl-2-ethyl) α-methyl-styrene were incorporated into a butadiene-styrene backbone. The resulting functionalized polymer was applied to the preparation of silica-rubber compounds, and the rolling resistance related tan delta values were measured at 60° C. The reference polymer sample not containing any backbone functionalization resulted in a tan delta value of 0.145, while the highest modification degree (5 wt %) led to a decreased tan delta value of 0.073.

Polar groups containing compounds, called, and defined as, polar coordinator compounds in the present disclosure, however are known to influence the polymerization kinetic, and thus the 1,2-polybutadiene, as well as the styrene, composition distribution and concentration in the (co)polymer. Therefore the application of functionalized monomers requires the development of new polymerization recipes, when an equivalent microstructure of the functionalized polymer is desired. Accordingly, it is beneficial to modify the polymer backbone after essentially completing the monomer conversion.

There are a few references describing the vulcanization of polydienes with low molecular weight dithiols in the presence of peroxides.

The Examples of such technique include:
(3) Strecker, R. A. H., Rubber Chemistry and Technology, 44/3, (1971), 675-689, and
(4) U.S. Pat. No. 3,876,723.

According to reference (3), liquid polybutadienes were cured with dithiols of lower molecular weight, such as, for example, hexane-1,6-dithiol and 3,4-dimercaptotoluene in the presence of dicumylperoxide or t-butylperbenzoate, as initiator, at temperatures below 100° C. The products of the curing reaction had an improved stability against hydrolysis and air oxidation. Reportedly "strain at break" values decreased with an increasing dithiol concentration. No cure was obtained with the peroxide absent. Similarly, U.S. Pat. No. 3,876,723 (4) describes a method of curing a polydiene using a polydithiol, a polyepoxide and an amine compound (the last two compounds representing a radical initiator system) in a period of 50 to 84 hours at a temperature of 80 to 100° C. As result of the dithiol addition, increased vulcanizate elongation values were reported. Thus, both references describe peroxide initiated reactions of the dithiol with the polydiene.

For a backbone modification of a polydiene, prepared in solution, it would be beneficial to avoid the addition of peroxide initiators. The peroxide represents an additional component in the polymerization process, which also causes polymer chain crosslinking through radical formation along the polymer backbone. In addition the peroxide initiated functionalization requires extra time. Also side products of the peroxide initiator and of the amine component need to be considered, and in some occasions need to be removed. Therefore, it would be beneficial to react a thiol or sulfide containing compound with the polymer backbone, without having the need of auxiliary compounds.

Other references describe the curing of low molecular weight polybutadiene in the presence of low molecular weight dithiols.

The Examples of such technique include:
(5) U.S. Pat. No. 3,338,810, and
(6) U.S. Pat. No. 2,964,502.

A method of making a clear solid polymer comprising reacting a low molecular weight (C2-C6) alkyl polythiol Y(SH)n (n=2-6), and a liquid polydiene, in the presence of ultraviolet light, is described in reference (5). The molecular weight of liquid polydienes usually is considered to be below 50,000 g/mol, where it becomes waxy. The molecular weight of 1500 g/mol, given as example, is in the proposed range for a liquid diene polymer. A solid polymer is, according to the given examples, obtained after 15 or 30 hours respectively. In another reference (5) "in-situ" made 2,5-dimercapto-1,3,4-thiadiazole was reacted with liquid polybutadiene to produce a solid polymer product. The curing reaction was initiated by heating the mixture up to a temperature of, for example, 188° C. This temperature is needed for a relatively long period, such as exemplary, 73 hours.

The curing period as presented in reference (5) and (6) is very long. Compound vulcanizates prepared for tires need to be prepared in minutes, such as, for example, within 5 to 30 minutes. Accordingly such a long vulcanization period would not be acceptable for the production of elastomeric tire components. In addition liquid polymers can not be easily processed by a tire producer.

Additionally, vulcanizates are reportedly made from low molecular weight dithiol containing polydiene carbon black compounds. The dithiols were added in the course of the compounding or milling process.

Examples of such techniques include:
(7) Hull C. M. et al., Journal of Industrial and Engineering Chemistry, 40, (1948), 513-517.

In reference (7), the characteristic of emulsion butadiene-styrene rubber (GR-S rubber)—carbon black compound vulcanizates, prepared in the presence of low molecular weight dithiols was investigated. Modulus 300%, and tensile strength, of the compound vulcanizates changed when different dithiols were added. The tensile strength of vulcanizates made by using dithiols was mentioned to be higher than the use of one of dithiol free vulcanizates. The addition of dithiol compounds to the GR-S cement resulted in cement gelation, assumed to be caused from enhanced polymer chain crosslinking. Aside from the aforementioned gelation experiment, Table III suggests that the dithiols were always added as pure component to the carbon black compound mixture, prior to the vulcanization. Thus, the low molecular weight dithiols are only combined with an uncrosslinked elastomeric polymer during compounding. This approach is disadvantaged due to the difficulty of distributing the dithiol compound throughout the rubber mixture during compounding. That is, unlike the typical low viscous, solvent-based environment associated with most anionic polymerizations, the rubber compounding environment is typically highly viscous and solvent free, thus leading to a less homogenous distribution of the coupling agent throughout the composition. As consequence, the interaction of the functionalized polymer with the filler material and/or unsaturated segments of the polymer backbone is less balanced and thus less complete.

Another example, U.S. Pat. No. 6,696,523, describes hydroxyl group-containing rubbers built up from diolefins and from hydroxylmercaptanes and mercaptocarboxylic esters in combination with radical starters such as for example azobisisobutyronitrile or dilauroylperoxide. For a backbone modification of a polydiene, it would be beneficial to avoid the addition of radical forming initiator compounds as discussed above.

And yet polyfunctional thiol—monofunctional thiol mixtures were applied as chain transfer agent in the preparation of emulsion made styrene-butadiene latex (8).

Examples of such techniques include: (8) International Publication No. WO 02/50128.

After forming seed latex particles, in a first polymerization step, the polyfunctional thiol was added as component in a second and third step. The second and third polymerization step were performed to cover the seed latex particles with a first and a second shell. The resulting latex, when applied to the preparation of coated paper, was reported to have an improved polymerization stability, mechanical stability and adhesion. The dithiol was exclusively mentioned in the patent application to act as chain transfer agent, and thus the dithiol is not expected to yield a functionalized polymer using this technology.

Furthermore backbone modified polybutadienes of the general formula:

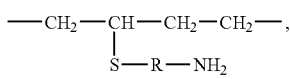

are described in reference (9), German Application No. 1,910,177, for the preparation of HIPS and varnish.

According to the reference (9), the preparation of the modified polybutadienes was performed through reaction of preferably low molecular weight polydienes ($M_w$<100,000 g/mol) with low molecular weight aminothiols (HS—R—$NH_2$ and HS—R(COOH)—$NH_2$) in the presence of suitable radical forming initiator compounds such as for example azodiisobutyronitril.

As stated above for a backbone modification of a polydiene, prepared in solution, it would be beneficial not to add peroxide initiators to avoid at least one of the following:
a) additional reaction time for a further modification step, and
b) problems with additional components in the polymer preparation process
c) carbon-carbon crosslink formation.

Therefore, it would be beneficial to react a thiol or sulfide containing compound with the polymer backbone, without having the need of auxiliary compounds. Also it would be beneficial to react sufficiently high molecular weight thiol or sulfide containing compounds with the polymer backbone to avoid a partial or complete removal of backbone modification agent prior to polymer modification, during polymer work-up, which often involves elevated work-up process temperatures.

Below described backbone modification mechanism is especially beneficial for high molecular weight polymers though no limitation is given to the molecular weight of polymers. In case of high molecular weight rubber, the proportion by weight of end groups is small and can therefore have only a small effect on the interaction between filler and rubber or between different rubber polymer chains. The present invention is intended to provide polymer chains in elastomeric polymer compositions having a much higher concentration of polymer bound effective groups for interacting with fillers and/or with polymer chains.

SUMMARY OF THE INVENTION

The invention provides a composition comprising a polymer formed from a first composition comprising:
  i) an uncrosslinked elastomeric polymer, and
  ii) a sulfide modifier represented by Formula 1:

 (Formula 1), and wherein
  Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;
  S is sulfur;
  A is hydrogen, —$(S)_p$—R1 or -MR2R3R4;
  Z is —SH, —S-MR5R6R7, —S—$(S)_p$—R8, —NR9R10, —NR11COR12, —O—CO—R13, —NCO, or —COOR14;
  M is silicon or tin;
  N is nitrogen;
  O is oxygen;
  m is the number one, two or three;
  p is the number one, two, three, four or five;
  R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In another aspect, the invention provides a crosslinked composition comprising an elastomeric polymer formed from a second composition comprising:
  1) a filler;
  2) a vulcanization agent; and
  3) a modified polymer, which is formed from a first composition comprising:
    i) an uncrosslinked elastomeric polymer, and
    ii) a sulfide modifier represented by the Formula 1:

 (Formula 1), and wherein
  Y is ($C_{12}$-$C_{100}$) aralkyl, ($C_{12}$-$C_{100}$) aryl, ($C_{12}$-$C_{100}$) alkyl and ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;
  S is sulfur;
  A is hydrogen, —$(S)_p$—R1 or -MR2R3R4;
  Z is —SH, —S-MR5R6R7, —S—$(S)_p$—R8, —NR9R10, —NR11COR12, —O—CO—R13, —NCO, or —COOR14;
  M is silicon or tin;
  N is nitrogen;
  O is oxygen;
  m is the number one, two or three;
  p is the number one, two, three, four or five; and
  R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each, independently, selected from ($C_1$-$C_{16}$) alkyl, ($C_6$-$C_{16}$) aryl, or ($C_7$-$C_{16}$) aralkyl.

In another aspect, the invention provides a composition comprising:
  1) a filler;
  2) a vulcanization agent; and
  3) a modified polymer which is the reaction product of:
    i) an uncrosslinked elastomeric polymer, and
    ii) a sulfide modifier represented by Formula 1:

 (Formula 1), and wherein
  Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;

S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In another aspect, the invention provides a composition comprising a polymer formed from the following:
i) an uncrosslinked elastomeric polymer, and
ii) a sulfide modifier represented by the Formula 3:

A-S—R'—S-A (Formula 3), and wherein
R' is (C$_{12}$-C$_{100}$) alkyl which is linear or branched, (C$_{12}$-C$_{100}$) aralkyl, or (C$_{12}$-C$_{100}$) aryl;
S is sulfur;
A is hydrogen, —S—(S)$_p$—R1 or —SiR2R3R4;
p is the number one two or three; and
R1, R2, R3 and R4 are the same or different and are each independently selected from (C$_1$-C$_{16}$) alkyl, (C$_6$-C$_{16}$) aryl, or (C$_7$-C$_{16}$) aralkyl.

In another aspect, the invention provides a composition comprising:
i) an uncrosslinked elastomeric polymer, and
ii) a sulfide modifier represented by the formula:

AS—Y-Zm (Formula 1), and wherein
Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl;
S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen;
m is the number one, two, three, four or five;
p is the number one, two, three, four or five;
R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In another aspect, the invention provides a modified polymer formed from a composition or a reaction comprising:
i) an uncrosslinked elastomeric polymer, and
ii) a sulfide modifier, represented by the Formula 1:

AS—Y-Zm (Formula 1), and wherein
Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl;

S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In another aspect, the invention provides a modifier according to Formula 1,

AS—Y-Zm (Formula 1), wherein
Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl;
S is sulfur;
A is —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In another aspect, the invention provides a modifier according to Formula 3,

A-S—R'—S-A (Formula 3), and wherein
R' is (C$_{12}$-C$_{100}$) alkyl which is linear or branched, (C$_{12}$-C$_{100}$) aralkyl, or (C$_{12}$-C$_{100}$) aryl;
S is sulfur;
A is hydrogen, —S—(S)$_p$—R1 or —SiR2R3R4;
p is the number one two or three; and
R1, R2, R3 and R4 are the same or different, and are each, independently, selected from (C$_1$-C$_{16}$) alkyl, (C$_6$-C$_{16}$) aryl or (C$_7$-C$_{16}$) aralkyl.

In another aspect, the invention provides a method for making a vulcanized elastomeric polymer composition comprising combining the following constituents:
1) a filler;
2) a vulcanization agent; and
3) a modified polymer formed from a first composition comprising:
i) an uncrosslinked elastomeric polymer, and
ii) a sulfide modifier represented by the Formula 1:

AS—Y-Zm (Formula 1), and wherein
Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl;

S is sulfur;

A is hydrogen, $-(S)_p-R1$ or $-MR2R3R4$;

Z is $-SH$, $-S-MR5R6R7$, $-S-(S)_p-R8$, $-NR9R10$, $-NR11COR12$, $-O-CO-R13$, $-NCO$, or $-COOR14$;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In another aspect, the invention provides a method of making the modified polymer composition, said method comprising mixing the following components:

i) an uncrosslinked elastomeric polymer, and ii) a sulfide modifier represented by Formula 1:

AS—Y-Zm (Formula 1), and wherein

Y is $(C_{12}-C_{100})$ aralkyl, $(C_{12}-C_{100})$ aryl, $(C_{12}-C_{100})$ alkyl, or $(C_{12}-C_{100})$ dialkylether (alkyl-O-alkyl), and wherein each may be optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl;

S is sulfur;

A is hydrogen, $-(S)_p-R1$ or $-MR2R3R4$;

Z is $-SH$, $-S-MR5R6R7$, $-S-(S)_p-R8$, $-NR9R10$, $-NR11COR12$, $-O-CO-R13$, $-NCO$, or $-COOR14$;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

DETAILED DESCRIPTION

The subject invention includes a modified polymer composition comprising the product of combining an uncrosslinked elastomeric diene polymer and a sulfide or thiol containing modifier represented by Formula 1, preferably Formula 2 and more preferably Formula 3 as presented below. The subject invention further includes a backbone modified elastomeric polymer. The invention further includes methods for making backbone modified elastomeric polymer compositions by using modified uncrosslinked diene polymer and their use in preparing vulcanized and thus cross-linked elastomeric polymer compositions. The invention further includes articles made from such modified elastomeric compositions such as pneumatic tires, tire treads, belts, footwear components, gaskets, seals, airsprings, pipes, hoses, conveyor belts, building and construction materials.

The subject cross-linked elastomeric polymer compositions exhibit lower Tan δ values at 60° C., and a good balance of physical properties, including one or more of: abrasion resistance, tensile strength, modulus, heat build up and tear, while compounds comprising the elastomeric polymers (compounds prior to vulcanization) maintain good processing characteristics, The subject compositions are useful in preparing tire treads having lower rolling resistance, while maintaining good grip and wear properties. The subject compositions are particularly useful in preparing tires including fillers such as carbon black, silica, carbon-silica dual phase filler.

In particular, the invention provides a composition comprising a polymer formed from a first composition comprising:

i) an uncrosslinked elastomeric polymer, and ii) a sulfide modifier represented by Formula 1:

AS—Y-Zm (Formula 1), and wherein

Y is $(C_{12}-C_{100})$ aralkyl, $(C_{12}-C_{100})$ aryl, $(C_{12}-C_{100})$ alkyl, or $(C_{12}-C_{100})$ dialkylether (alkyl-O-alkyl), and wherein each may be optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl;

S is sulfur;

A is hydrogen, $-(S)_p-R1$ or $-MR2R3R4$;

Z is $-SH$, $-S-MR5R6R7$, $-S-(S)_p-R8$, $-NR9R10$, $-NR11COR12$, $-O-CO-R13$, $-NCO$, or $-COOR14$;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, Y is $(C_{12}-C_{100})$ aralkyl, $(C_{12}-C_{100})$ aryl, $(C_{12}-C_{100})$ alkyl, or $(C_{12}-C_{100})$ dialkylether (alkyl-O-alkyl), and wherein each may be linear or branched, saturated or unsaturated, and optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl.

The invention also provides a crosslinked composition comprising an elastomeric polymer formed from a second composition comprising:

1) a filler;

2) a vulcanization agent; and 3) a modified polymer, which is formed from a first composition comprising:

i) an uncrosslinked elastomeric polymer, and ii) a sulfide modifier represented by the Formula 1:

AS—Y-Zm (Formula 1), and wherein

Y is $(C_{12}-C_{100})$ aralkyl, $(C_{12}-C_{100})$ aryl, $(C_{12}-C_{100})$ alkyl and $(C_{12}-C_{100})$ dialkylether (alkyl-O-alkyl), and wherein each may be optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl;

S is sulfur;

A is hydrogen, $-(S)_p-R1$ or $-MR2R3R4$;

Z is —SH, —S-MR5R6R7, —S—(S)$_p$—R8, —NR9R10, —NR11COR12, —O—CO—R13, —NCO, —COOR14;

M is silicon or tin;

N is nitrogen;

O is oxygen;

m is the number one, two or three;

p is the number one, two, three, four or five; and

R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each, independently, selected from (C$_1$-C$_{16}$) alkyl, (C$_6$-C$_{16}$) aryl, or (C$_7$-C$_{16}$) aralkyl.

In one embodiment, Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be linear or branched, saturated or unsaturated, and optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl.

The invention also provides a composition comprising:
1) a filler;
2) a vulcanization agent; and
3) a modified polymer which is the reaction product of:
i) an uncrosslinked elastomeric polymer, and
ii) a sulfide modifier represented by Formula 1:

$$AS—Y-Zm \quad \text{(Formula 1), and}$$

wherein

Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl;

S is sulfur;

A is hydrogen, —(S)$_p$—R1 or -MR2R3R4;

Z is —SH, —S-MR5R6R7, —S—(S)$_p$—R8, —NR9R10, —NR11COR12, —O—CO—R13,

—NCO, or —COOR14;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In one embodiment, Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be linear or branched, saturated or unsaturated, and optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl.

The invention also provides a composition comprising:
i) an uncrosslinked elastomeric polymer, and
ii) a sulfide modifier represented by the formula:

$$AS—Y-Zm \quad \text{(Formula 1), and}$$

wherein

Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl;

S is sulfur;

A is hydrogen, —(S)$_p$—R1 or -MR2R3R4;

Z is —SH, —S-MR5R6R7, —S—(S)$_p$—R8, —NR9R10, —NR11COR12, —O—CO—R13, —NCO, or —COOR14;

M is silicon or tin;

N is nitrogen;

O is oxygen;

m is the number one, two, three, four or five;

p is the number one, two, three, four or five;

R1, R2, R3, R4, R5, R6, R7, R8, R9, R10, R11, R12, R13 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

In one embodiment, Y is (C$_{12}$-C$_{100}$) aralkyl, (C$_{12}$-C$_{100}$) aryl, (C$_{12}$-C$_{100}$) alkyl, or (C$_{12}$-C$_{100}$) dialkylether (alkyl-O-alkyl), and wherein each may be linear or branched, saturated or unsaturated, and optionally substituted with (C$_1$-C$_4$) alkyl, (C$_1$-C$_4$) alkoxy, (C$_7$-C$_{16}$) aryl, (C$_7$-C$_{16}$) aralkyl, nitrile, amine, NO$_2$, alkoxy, or thioalkyl.

In the above compositions, in another embodiment, Y is (C$_{12}$-C$_{100}$) alkyl, (C$_{12}$-C$_{100}$) aralkyl, or (C$_{12}$-C$_{100}$) aryl, and wherein each may be linear or branched, and saturated or unsaturated;

A is hydrogen, —(S)$_p$—R1 or —SiR2R3R4;

Z is SH, —S—SiR2R3R4, —S—(S)$_p$—R8, —NR9R10, —NR11COR12, or —COOR14;

m is the number one

R1, R2, R3, R4, R8, R9, R10, R11, R12 and R14 are the same or different, and are each, independently, selected from hydrogen (H), (C$_1$-C$_{16}$) alkyl, (C$_6$-C$_{16}$) aryl, (C$_7$-C$_{16}$) aralkyl or (C$_3$-C$_{30}$) tri(hydrocarbyl)silyl, and wherein the hydrocarbyl groups are each independently selected from (C$_1$-C$_{16}$) alkyl, (C$_6$-C$_{16}$) aryl, or (C$_7$-C$_{16}$) aralkyl.

The invention also provides a composition comprising a polymer formed from the following:
i) an uncrosslinked elastomeric polymer, and
ii) a sulfide modifier represented by the Formula 3:

$$A-S—R'—S-A \quad \text{(Formula 3), and}$$

wherein

R' is (C$_{12}$-C$_{100}$) alkyl which is linear or branched, (C$_{12}$-C$_{100}$) aralkyl, or (C$_{12}$-C$_{100}$) aryl, and preferably (C$_{15}$-C$_{50}$) alkyl which is linear or branched, and more preferably a (C$_{15}$-C$_{50}$) alkyl which is linear;

S is sulfur;

A is hydrogen, —S—(S)$_p$—R1 or —SiR2R3R4;

p is the number one two or three; and

R1, R2, R3 and R4 are the same or different and are each independently selected from (C$_1$-C$_{16}$) alkyl, (C$_6$-C$_{16}$) aryl, or (C$_7$-C$_{16}$) aralkyl.

In another embodiment, the uncrosslinked elastomeric polymer comprises a chemical moiety derived from at least one coupling agent selected from the group consisting of tin halide, tin alkoxide, silicon halide, and silicon alkoxide.

In another embodiment, the uncrosslinked elastomeric polymer is prepared from a mixture comprising at least one coupling agent selected from tin halide, tin alkoxide, silicon halide, and silicon alkoxide.

In another embodiment the first composition or the second composition further comprises an oil.

In another embodiment, the composition further comprises a polystyrene. In yet another embodiment, the composition further comprises a styrene/acrylnitrile copolymer.

In another embodiment, the composition further comprises a polyester.

In another embodiment, the composition further comprises a polyurethane.

In another embodiment the composition further comprises a butadiene/acrylonitrile copolymer with an acrylonitrile unit content of 5 to 60, preferably 20 to 50 weight percent (based on the weight of copolymer), and wherein the butadiene/acrylonitrile copolymer is partially hydrogenated or fully hydrogenated.

In another embodiment the composition further comprises an EPDM.

In another embodiment, the uncrosslinked elastomeric polymer is selected from at least one of isoprene homopolymers, isoprene copolymers, isoprene terpolymers, butadiene homopolymers, butadiene copolymers, butadiene terpolymers, butadiene-styrene copolymers or butadiene-styrene terpolymers.

In another embodiment, the second composition further comprises an oil.

In another embodiment, the filler comprises carbon black. In yet another embodiment, the filler comprises silica. In another embodiment, the filler is present in an amount from 10 to 100 parts by weight, based on 100 parts by weight of total elastomeric polymer, and wherein the vulcanization agent is present in an amount from 0.5 to 10 parts by weight, based upon 100 parts by weight of total elastomer polymer.

An inventive composition may comprise a combination of two or more embodiments as described herein.

The invention also provides a modified polymer formed from a reaction comprising:
i) an uncrosslinked elastomeric polymer, and
ii) a sulfide modifier, represented by the Formula 1:

$$AS\text{---}Y\text{-}Zm \quad \text{(Formula 1), and}$$

wherein
Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;
S is sulfur;
A is hydrogen, —$(S)_p$—R1 or -MR2R3R4;
Z is —SH, —S-MR5R6R7, —S—$(S)_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl.

The invention also provides a modified polymer formed from a composition comprising:
i) an uncrosslinked elastomeric polymer, and
ii) a sulfide modifier, represented by the Formula 1:

$$AS\text{---}Y\text{-}Zm \quad \text{(Formula 1), and}$$

wherein
Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;
S is sulfur;
A is hydrogen, —$(S)_p$—R1 or -MR2R3R4;
Z is —SH, —S-MR5R6R7, —S—$(S)_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl.

In the polymers discussed above, in another embodiment, Y is ($C_{12}$-$C_{100}$) alkyl, ($C_{12}$-$C_{100}$) aralkyl, or ($C_{12}$-$C_{100}$) aryl, and wherein each may be linear or branched, and saturated or unsaturated;
A is hydrogen, —$(S)_p$—R1 or —SiR2R3R4;
Z is —SH, —S—SiR2R3R4, —S—$(S)_p$—R8, —NR9R10, —NR11COR12, or —COOR14;
R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In another embodiment, the uncrosslinked elastomeric polymer comprises a chemical moiety derived from at least one coupling agent selected from the group consisting of tin halide, tin alkoxide, silicon halide, and silicon alkoxide.

In another embodiment, the composition further comprises at least one coupling agent selected from tin halide, tin alkoxide, silicon halide, or silicon alkoxide.

In another embodiment, the reaction further comprises at least one coupling agent selected from tin halide, tin alkoxide, silicon halide, or silicon alkoxide.

In another embodiment, the uncrosslinked elastomeric polymer is selected from at least one of isoprene homopolymers, isoprene copolymers, isoprene terpolymers, butadiene homopolymers, butadiene copolymers, butadiene terpolymers, butadiene-styrene copolymers or butadiene-styrene terpolymers.

The modified polymer may comprise a combination of two or more embodiments as described herein.

The invention also provides a modifier according to Formula 1, $$AS—Y-Zm \quad \text{(Formula 1)}$$

wherein

Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;

S is sulfur;

A is —(S)$_p$—R1 or -MR2R3R4;

Z is —SH, —S-MR5R6R7, —S—(S)$_p$—R8, —NR9R10, —NR11COR12, —O—CO—R13, —NCO, or —COOR14;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl.

In another embodiment, Y is ($C_{12}$-$C_{100}$) alkyl, ($C_{12}$-$C_{100}$) aralkyl, or ($C_{12}$-$C_{100}$) aryl, and wherein each may be linear or branched, and saturated or unsaturated;

A is hydrogen, —(S)$_p$—R1 or —SiR2R3R4;

Z is SH, —S—SiR2R3R4, —S—(S)$_p$—R8, —NR9R10, —NR11COR12, or —COOR14;

m is the number one

R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

The invention also provides a modifier according to Formula 3, $$A-S—R'—S-A \quad \text{(Formula 3), and}$$

wherein

R' is ($C_{12}$-$C_{100}$) alkyl which is linear or branched, ($C_{12}$-$C_{100}$) aralkyl, or ($C_{12}C_{100}$) aryl, and preferably ($C_{15}$-$C_{50}$) alkyl which is linear or branched; and more preferably ($C_{15}$-$C_{50}$) alkyl which is linear;

S is sulfur;

A is hydrogen, —S—(S)$_p$—R1 or —SiR2R3R4;

p is the number one two or three; and

R1, R2, R3 and R4 are the same or different, and are each, independently, selected from ($C_1$-$C_{16}$) alkyl, ($C_6$-$C_{16}$) aryl or ($C_7$-$C_{16}$) aralkyl.

An inventive modifier may comprise a combination of two or more embodiments as described herein.

The invention also provides a method for making a vulcanized elastomeric polymer composition comprising combining the following constituents:

1) a filler;

2) a vulcanization agent; and 3) a modified polymer formed from a first composition comprising:

i) an uncrosslinked elastomeric polymer, and ii) a sulfide modifier represented by the Formula 1:

$$AS—Y-Zm \quad \text{(Formula 1), and}$$

wherein

Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;

S is sulfur;

A is hydrogen, —(S)$_p$—R1 or -MR2R3R4;

Z is —SH, —S-MR5R6R7, —S—(S)$_p$—R8, —NR9R10, —NR11COR12, —O—CO—R13, —NCO, or —COOR14;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl.

The invention also provides a method of making the modified polymer composition, said method comprising mixing the following components:

i) an uncrosslinked elastomeric polymer, and ii) a sulfide modifier represented by Formula 1:

$$AS—Y-Zm \quad \text{(Formula 1), and}$$

wherein

Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;

S is sulfur;

A is hydrogen, —(S)$_p$—R1 or -MR2R3R4;

Z is —SH, —S-MR5R6R7, —S—(S)$_p$—R8, —NR9R10, —NR11COR12, —O—CO—R13, —NCO, or —COOR14;

M is silicon or tin;

N is nitrogen;

O is oxygen;

m is the number one, two or three;

p is the number one, two, three, four or five;

R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl. In a further embodiment, the components are mixed in a solution.

In one embodiment, Y is $(C_{12}-C_{100})$ aralkyl, $(C_{12}-C_{100})$ aryl, $(C_{12}-C_{100})$ alkyl, or $(C_{12}-C_{100})$ dialkylether (alkyl-O-alkyl), and wherein each may be linear or branched, saturated or unsaturated, and optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl.

In another embodiment, Y is $(C_{12}-C_{100})$ alkyl, $(C_{12}-C_{100})$ aralkyl, or $(C_{12}-C_{100})$ aryl, and wherein each may be linear or branched, and saturated or unsaturated;

A is hydrogen, —(S)$_p$—R1 or —SiR2R3R4;

Z is SH, —S—SiR2R3R4, —S—(S)$_p$—R8, —NR9R10, —NR11COR12, or —COOR14;

m is the number one

R1, R2, R3, R4, R8, R9, R10, R11, R12 and R14 are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

An inventive method may comprise a combination of two or more embodiments as described herein.

The invention also provides an article comprising at least one component formed from an inventive composition. In a further embodiment, the article is a tire tread.

The invention also provides an article comprising at least one component formed from an inventive polymer. In a further embodiment, the article is a tire tread.

Inventive articles include, but are not limited to, a tire component, an automotive part, a footwear component, a belt, a gasket, a seal, and a hose.

An inventive article may comprise a combination of two or more embodiments as described herein.

The sulfide modifier may be represented by any of the formulas as described herein.

The acronym "HIPS" represents a high impact polystyrene being a polybutadiene or butadiene-styrene copolymer modified polystyrene. The acronym "ABS" represents a polybutadiene or butadiene-styrene copolymer modified acrylonitril/styrene copolymer. The acronym "EPDM" represents a ethylene/propylene/diene interpolymer.

The term "composition," as used herein, includes a mixture of materials which comprise the composition, as well as reaction products and decomposition products formed from the materials of the composition.

Elastomeric polymers can be divided into two groups "cross-linked elastomeric polymers" and "uncrosslinked elastomeric polymers".

The term "crosslinked elastomeric polymers" is intended to mean elastomers or rubbers, representing at least partially cross-linked polymers having properties as known for, or similar to, vulcanized natural rubber (cis-1,4 polyisoprene); for example, stretch under tension and retract relatively quickly to approximately the original length when released. The polymer cross-links are for example formed through vulcanization using sulfur or through application of radical forming compounds, such as azo- or peroxide-containing compounds.

The term "uncrosslinked elastomeric polymers" is intended to mean the uncrosslinked precursor polymers of the above described crosslinked elastomeric polymers. It is noted that "uncrosslinked elastomeric polymers" comprise a predominant amount of polymer in uncrosslinked form, but may also comprise minor amounts of polymer in crosslinked form. For example, there may be present in an uncrosslinked elastomeric polymer less than 10 weight percent, preferably less than 5 weight percent, and more preferably less than 2 weight percent, based on the total weight of the elastomeric polymer, of a crosslinked polymer.

The term "elastomeric polymers," if used as such, includes both above defined groups, "cross-linked-" and "uncrosslinked elastomeric polymers."

Uncrosslinked elastomeric polymers, according to the invention, for use in compounds in the presence of above defined backbone modifier agent, can be prepared preferably by polymerization using coordination catalysts in the presence of a solvent or by anionic polymerization. Coordination catalysts in this connection are understood to be Ziegler-Natta catalysts, coordination catalysts and mono-metallic catalyst systems. Coordination catalysts are preferably those based on nickel, cobalt, titanium, vanadium, chromium or neodymium. Catalysts for anionic solution polymerization are based on alkali or alkaline earth metals.

The use of lithium initiators to polymerize conjugated diene, triene, and monovinyl aliphatic and aromatic monomers is well known (anionic solution polymerization). These polymerizations proceed according to anionic polymerization mechanisms, wherein the reaction of monomers is by nucleophilic initiation to form and propagate a polymeric structure. Throughout the polymerization, the polymer structure is ionic or "living." Thus, the polymer structure has at least one reactive or "living" end. This is the context of the term "living," as used herein, to describe those uncrosslinked elastomeric polymers prepared by an anionic solution polymerization technology.

Monomers useful in preparing the subject uncrosslinked elastomeric polymers include conjugated olefins and olefins chosen from the group comprising $\alpha$-olefins, internal olefins, cyclic olefins, polar olefins and nonconjugated diolefins. Suitable conjugated unsaturated monomers are preferably conjugated dienes, such as 1,3-butadiene, 2-alkyl-1,3-butadiene, preferably, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene. Preferred olefins are $C_{2-20}$ $\alpha$-olefins, including, but not limited to, long chain macromolecular $\alpha$-olefins, more especially an aromatic vinyl compound. Preferred aromatic vinyl compounds are styrene, including $C_{1-4}$ alkyl substituted styrene, such as 2-methylstyrene, 3-methylstyrene, 4-methylstyrene, 2,4-dimethylstyrene, 2,4,6-trimethylstyrene, $\alpha$-methylstyrene and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof. Suitable polar olefins included acrylonitrile, methacrylates, methylmethacrylate. Suitable nonconjugated olefins include: $C_{4-20}$ diolefins, especially norbornadiene, ethylidenenorbornene, 1,4-hexadiene, 1,5-hexadiene, 1,7-octadiene, 4-vinylcyclohexene, divinylbenzene including 1,2-divinylbenzene, 1,3-divinylbenzene and 1,4-divinylbenzene and mixtures thereof. Preferred conjugated dienes include: butadiene, isoprene and cyclopentadiene, and preferred aromatic $\alpha$-olefins include: styrene and 4-methylstyrene.

Examples of applicable uncrosslinked elastomeric polymers include homopolymers of conjugated dienes, especially butadiene or isoprene, and random or block co- and terpolymers of at least one conjugated diene, especially butadiene or isoprene, with at least one conjugated diene or with at least one aromatic $\alpha$-olefin and especially styrene and 4-methylstyrene, aromatic diolefin, especially divinylbenzene. Especially preferred is the random copolymerization, optionally terpolymerization, of at least one conjugated diene with at least one aromatic α-olefin, and optionally at least one aromatic diolefin or aliphatic α-olefin, and especially butadiene or isoprene with styrene, 4-methylstyrene and/or divinylbenzene. Additionally, especially preferred is the random copolymerization of butadiene with isoprene.

Examples of applicable elastomeric polymers include the following:

BR—polybutadiene,
ABR—butadiene/$C_1$-$C_4$-alkyl acrylate copolymers,
HIPS—butadiene/styrene copolymers,
CR—polychloroprene,
IR—polyisoprene,
SBR—styrene/butadiene copolymers with styrene unit content of 1 to 60 weight percent, preferably 20 to 50 weight percent, based on the total weight of the copolymer,
IIR—isobutylene/isoprene copolymers,
NBR—butadiene/acrylonitrile copolymers with acrylonitrile unit content of 5 to 60 weight percent, preferably 20 to 50 weight percent, based on the total weight of the copolymer,
HNBR—partially hydrogenated or fully hydrogenated NBR rubber,
EPDM—ethylene/propylene/diene interpolymers,
and mixtures of theses rubbers.

In one embodiment, elastomeric polymer is a polybutadiene.

In another embodiment, the elastomeric polymer is a butadiene/C1-C4-alkyl acrylate copolymer.

In another embodiment, the elastomeric polymer is a butadiene/styrene copolymer.

In another embodiment, the elastomeric polymer is a polychloroprene.

In another embodiment, the elastomeric polymer is a polyisoprene.

In another embodiment, the elastomeric polymer is a styrene/butadiene copolymer with a styrene unit content of 1 to 60 weight percent, preferably 20 to 50 weight percent, based on the total weight of the copolymer.

In another embodiment, the elastomeric polymer is an isobutylene/isoprene copolymer.

In another embodiment, the elastomeric polymer is a butadiene/acrylonitrile copolymers with an acrylonitrile unit content of 5 to 60 weight percent, preferably 20 to 50 weight percent, based on the total weight of the copolymer.

In another embodiment, the elastomeric polymer is a partially hydrogenated or fully hydrogenated NBR rubber.

In another embodiment, the elastomeric polymer is an ethylene/propylene/diene interpolymer.

For producing vehicle tires, natural rubber, emulsion SBR and solution SBR rubbers with a glass transition temperature above −50° C., polybutadiene rubber with a high cis 1,4 content (>90%), which has been prepared using catalysts based on nickel, cobalt, titanium or neodymium, and polybutadiene rubber with a vinyl content of 0 to 75%, and their mixtures, are of particular interest.

For producing vehicle tires furthermore, polybutadiene rubber with a high trans 1,4 content (>75%), or SBR preferably containing between 5 and 40 wt % styrene and a high trans 1,4-polybutadiene content (>75%) of the polybutadiene fraction of the copolymer, and which each type of polymer (SBR or BR) has been prepared with one or more initiator compounds comprising earth alkaline metal compounds, such as described for example in U.S. Pat. Nos. 6,693,160; 6,627,715; 6,489,415; 6,103,842; 5,753,579; 5,086,136 and 3,629,213, incorporated herein as reference, or by using catalysts based on cobalt, such as described for example in U.S. Pat. Nos. 6,310,152; 5,834,573; 5,753,761; 5,448,002 and 5,089,574, and U.S. Publication No. 20030065114, or by using catalysts based on vanadium, such as described for example in European Patent Application No. 1367069; Japanese Patent Application No. 11301794 and U.S. Pat. No. 3,951,936, or by using catalysts based on neodymium, such as described, for example, in European Patent Application Nos. EP0964008 and EP0924214 and in U.S. Pat. Nos. 6,184, 168; 6,018,007; 4,931,376; 5,134,199 and 4,689,368.

For producing vehicle tires, high impact polystyrene (HIPS) and for producing butadiene modified acrylonitrile-styrene copolymer (ABS) furthermore, polybutadiene rubber with a high cis-1,4 content between 70 and 90 wt % and a 1,2-polybutadiene content between 5 and 25 wt % have been prepared by using catalysts based on chromium and vanadium. Examples are described for example in European Patent Application Nos. EP0778291 and EP0841375 and in U.S. Pat. No. 5,981,667.

In general, the polymerization of the diene monomer(s), or copolymerization of the diene monomer(s) with the α-olefin monomer(s), may be accomplished at conditions well known in the art for anionic living type polymerization reactions, for metal complex catalyst based polymerization reactions, or for radical emulsion polymerization reactions. For such polymerizations, typical temperatures are from −50 to 250° C., preferably from 0 to 120° C. The reaction temperature may be the same as the polymerization initiation temperature. The polymerization can be effected at atmospheric pressure, at sub-atmospheric pressure, or at elevated pressures of up to, or even higher than, 500 MPa, continuously or discontinuously. Preferably, the polymerization is performed at pressures from 0.01 and 500 MPa, more preferably from 0.01 and 10 MPa, and most preferably from 0.1 and 2 MPa. Higher pressures can be applied. In such a high-pressure process, the initiator according to the present invention, can also be used with good results. Solution polymerizations normally take place at lower pressures, preferably below 10 MPa. The polymerization can be carried out in the gas phase, as well as in a liquid reaction medium. The polymerization is generally conducted under batch, continuous or semi-continuous polymerization conditions. The polymerization process can be conducted as a gas phase polymerization (for example in a fluidized bed or stirred bed reactor), as a solution polymerization, wherein the polymer formed is substantially soluble in the reaction mixture, or a suspension/slurry polymerization, wherein the polymer formed is substantially insoluble in the reaction medium, or as a so-called bulk polymerization process, in which an excess of monomer to be polymerized, is used as the reaction medium.

Polymerization of the aforementioned monomers is, in case of anionic living type polymerization reactions, typically initiated with an anionic initiator, such as, but not limited to, an organo metal compound having at least one lithium, sodium or potassium atom, and where the organo metal compounds contain from 1 to about 20 carbon atoms. Preferably the organo metal compound has at least one lithium atom, such as ethyl lithium, propyl lithium, n-butyl lithium, sec-butyl lithium, tert-butyl lithium, phenyl lithium, hexyl lithium, 1,4-dilithio-n-butane, 1,3-di-(2-lithio-2-hexyl)benzene, and preferably n-butyl lithium and sec-butyl lithium. These organo lithium initiators may be used alone or in combination as a mixture of two or more different kinds. The amount of organo lithium initiator used, varies, based upon the monomers being polymerized and on the target molecular weight of the produced polymer; however, the amount is typically from 0.1 to 5 mmol, preferably from 0.3 to 3 mmol per 100 grams of monomer.

Polar coordinator compounds may be optionally added to the polymerization mixture to adjust the microstructure (the content of vinyl bond) of the conjugated diolefin portion of diolefin-type homo-, co- or terpolymer, or to adjust the composition distribution of the aromatic vinyl compound in the conjugated diene monomer containing co- or terpolymer, and thus for example to serve as randomizer component. Polar coordinator compounds are, for example, but not limited to, ether compounds, such as diethyl ether, di-n-butyl ether, ethylene glycol diethyl ether, ethylene glycol dibutylether, diethylene glycol dimethyl ether, propylene glycol dimethyl ether, propylene glycol diethyl ether, propylene glycol dibutylether, alkyltetrahydroforylethers, such as, methyltetrahydrofurylether, ethyltetrahydrofurylether, propyltetrahydrofurylether, butyltetrahydrofurylether, hexyltetrahydrofurylether, octyltetrahydrofurylether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, and dimethoxyethane, and/or tertiary amine compounds, such as butyl ether of triethylamine, pyridine, N,N,N',N'-tetramethyl ethylenediamine, dipiperidinoethane, methyl ether of N,N-diethylethanolamine, ethyl ether of N,N-diethylethanolamine, and N,N-diethylethanolamine. The polar coordinator compound will typically be added at a molar ratio of the polar coordinator compound to the lithium initiator within the range from 0.012:1 to 5:1, but typically from 0.1:1 to 4:1, preferably from 0.25:1 to about 3:1, and more preferably from 0.5:1 to 3:2.

The polymerization can optionally be conducted utilizing an oligomeric oxolanyl alkane as a polar coordinator compound. Examples of such compounds are provided in U.S. Pat. Nos. 6,790,921 and 6,664,328.

The polymerization can optionally include accelerators to increase the reactivity of the initiator, to randomly arrange aromatic vinyl compounds introduced in the polymer, or to provide a single chain of aromatic vinyl compounds, and thus influencing the composition distribution of the aromatic vinyl compounds in a conjugated diene containing modified co- or terpolymer of the invention. Examples of applicable accelerators include sodium alkoxides or sodium phenoxides and potassium alkoxides or potassium phenoxides, preferably potassium alkoxides or potassium phenoxides, such as, potassium isopropoxide, potassium t-butoxide, potassium t-amyloxide, potassium n-heptaoxide, potassium benzyloxide, potassium phenoxide; potassium salts of carboxylic acids, such as isovalerianic acid, caprylic acid, lauryl acid, palmitic acid, stearic acid, oleic acid, linolenic acid, benzoic acid, phthalic acid, or 2-ethylhexanoic acid; potassium salts of organic sulfonic acids such as dodecyl benzenesulfonic acid, tetradecyl benzenesulfonic acid, hexadecyl benzenesulfonic acid, or octadecyl benzenesulfonic acid; and potassium salts of organic phosphorous acids, such as diethyl phosphite, diisopropyl phosphite, diphenyl phosphite, dibutyl phosphite, and dilauryl phosphite. These potassium compounds may be added in an amount from 0.005 to 0.5 mole for 1.0 gram atom equivalent of lithium initiator. If less than 0.005 mole is added, a sufficient effect is not typically achieved. On the other hand, if the amount of the potassium compound is more than about 0.5 mole, the productivity and efficiency of chain end modification reaction is significantly reduced.

An alkali metal alkoxide compound may also be added together with the polymerization initiator, to increase the polymerization reactivity. The alkali metal alkoxide compound can be prepared by reacting an alcohol and an organic alkali metal compound. This reaction may be carried out in a hydrocarbon solvent in the presence of monomers, preferably conjugated diolefin monomers and aromatic vinyl compound monomers, prior to the copolymerization of these monomers. Alkali metal alkoxide compound are exemplary represented by metal alkoxides of tetrahydrofurfuryl alcohol, N,N-dimethyl ethanolamine, N,N-diethyl ethanolamine, 1-piperazine ethanolamine, or the like. An organic alkali metal compound, preferably an organolithium compound, can be used as reactant for an alcohol compound to prepare an alkali metal alkoxide. For example, ethyl lithium, propyl lithium, n-butyllithium, sec-butyl lithium, tert-butyl lithium, and hexyl lithium, and mixtures of these can be given. Of these, n-butyl lithium and sec-butyl lithium are preferable. The molar ratio of an alcoholic compound and an organolithium compound should be from 1:0.7 to 1:5.0, preferably from 1:0.8 to 1:2.0, and more preferably from 1:0.9 to 1:1.2. If the molar ratio of an organolithium compound to an alcoholic compound is more than 5.0, the effect on improvement of tensile strength, abrasion resistance, and hysteresis is compromised. On the other hand, a molar ratio of the organolithium compound smaller than 0.8 retards the speed of polymerization and significantly decreases productivity giving rise to low efficiency of the chain end modification reaction.

To further control polymer molecular weight and polymer properties, a coupling agent or linking agent may be employed. For example, a tin halide, a silicon halide, a tin alkoxide, a silicon alkoxide, or a mixture of the aforementioned compounds, can be continuously added during the polymerization in cases where asymmetrical coupling is desired. This continuous addition is normally done in a reaction zone, separate from the zone where the bulk of the polymerization is occurring. The coupling agent can be added in a hydrocarbon solution, for example, cyclohexane, to the polymerization admixture with suitable mixing for distribution and reaction. The coupling agent will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added. Common halide coupling agents include tin tetrachloride, tin tetrabromide, tin tetrafluoride, tin tetraiodide, silicon tetrachloride, silicon tetrabromide, silicon tetrafluoride, silicon tetraiodide, tin and silicon trihalides or tin and silicon dihalides can also be used. Polymers coupled with tin or silicon tetrahalides have a maximum of four arms, tin and silicon trihalides have a maximum of three arms and tin and silicon dihalides have a maximum of two arms. Hexahalo disilanes or hexahalo disiloxanes can also be used as coupling agents, resulting in polymers with a maximum of six arms. Useful tin and silicon halides coupling agents include $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si-SiCl_3$, $Cl_3Si-O-SiCl_3$, $Cl_3Sn-SnCl_3$, $Cl_3Sn-O-SnCl_3$. Examples of tin and silicon alkoxides coupling agents include: $Sn(OMe)_4$, $Si(OMe)_4$, $Sn(OEt)_4$ or $Si(OEt)_4$. The most preferred coupling agents are: $SnCl_4$, $SiCl_4$, $Sn(OMe)_4$ and $Si(OMe)_4$.

A combination of a tin or silicon compound, as described before, can optionally be used to couple the polymer. By using such a combination of tin and silicon coupling agents, improved properties for tire rubbers, such as lower hysteresis, can be attained. It is particularly desirable to utilize a combination of tin and silicon coupling agents in tire tread compounds that contain both silica and carbon black. In such cases, the molar ratio of the tin to the silicon compound employed in coupling the uncrosslinked elastomeric polymer will normally be within the range from 20:80 to 95:5; more typically from 40:60 to 90:10, and preferably from 60:40 to 85:15. Most typically, a range from 0.01 to 4.5 milliequivalents of coupling agent (tin and silicon compound) is employed per 100 grams of the uncrosslinked elastomeric polymer. It is normally preferred to utilize from 0.01 to 1.5 milliequivalents of the coupling agent per 100 grams of polymer to obtain the desired Mooney viscosity. The larger quantities tend to produce polymers containing terminally reactive groups or insufficient coupling. Between zero and less than one equivalent of tin and/or silicon coupling group per equivalent of lithium initiator is used to enable subsequent functionalization of the remaining living polymer fraction. For instance, if a tin or silicon tetrachloride or a mixture of these compounds is used as the coupling agent, between 0 and less than 1.0 mole, preferably between 0 and 0.8 mole, and more preferably between 0 and 0.6 mole, of the coupling agent is utilized for every 4.0 moles of live lithium polymer chain ends. The coupling agent can be added in a hydrocarbon solution, for example, in cyclohexane, to the polymerization admixture in the reactor with suitable mixing for distribution and reaction.

For solution based polymerization processes, the polymerization is conducted in a suitable solvent, dispersion agents or diluent. Non-coordinating, inert liquids are preferred, including, but not limited to, straight and branched-chain hydrocarbons such as propane, butane, isobutane, pentane, hexane, heptane, octane, cyclic and alicyclic hydrocarbons, such as cyclohexane, cycloheptane, methylcyclohexane, methylcycloheptane, aromatic and alkyl-substituted aromatic compounds, such as benzene, toluene, and xylene and isomers of the foregoing, and mixtures thereof, as well as pentamethyl heptane or mineral oil fractions such as light or regular petrol, naphtha, kerosene or gas oil. Fluorinated hydrocarbon fluids, such as perfluorinated $C_{4-10}$ alkanes are also suitable. Further, suitable solvents, including liquid olefins, which may act as monomers or comonomers in the polymerization process, including propylene, 1-butene, 1-pentene, cyclopentene, 1-hexene, 3-methyl-1-pentene, 4-methyl-1-pentene, butadiene, isoprene, 1,4-hexadiene, 1,7-octadiene, 1-octene, 1-decene, styrene, divinylbenzene, ethylidenenorbornene, allylbenzene, 2-methylstyrene, 3-methylstyrene, 4-methylstyrene, 4-vinylcyclohexene, and vinylcyclohexane. Mixtures of the solvents are also suitable. Aromatic hydrocarbons, for instance benzene and toluene, can also be used.

The terms backbone modifier is intended to mean the subject sulfide compound described herein with reference to Formulae 1, 2 and 3 below. The term "backbone modified cross-linked elastomeric polymer" is intended to mean the vulcanized or cross-linked reaction product of an uncrosslinked elastomeric modified polymer. The term "modified uncrosslinked elastomeric polymer" is intended to mean the product of the combination of the uncrosslinked elastomeric polymer with a subject backbone modifier.

The subject modifier includes compounds according to Formula 1:

AS—Y-Zm    (Formula 1), wherein
Y is $(C_{12}-C_{100})$ aralkyl, $(C_{12}-C_{100})$ aryl, $(C_{12}-C_{100})$ alkyl and $(C_{12}-C_{100})$ dialkylether (alkyl-O-alkyl), and wherein each may be optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy or thioalkyl;
S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen; and
m is the number one, two or three;
p is the number one, two, three four or five; and
R1, R2, R3, R4, R5, R6, R7, R8, R9, R10, R11, R12, R13 and R14 are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl. The hydrocarbyl groups are each, independently, selected from $(C_1-C_{16})$ alkyl, $(C_6-C_{16})$ aryl, or $(C_7-C_{16})$ aralkyl. Preferably R1, R2, R3, R4, R5, R6, R7, R8, R9, R10, R11, R12, R13 and R14 are the same or different, and are each independently selected from hydrogen (H), $(C_1-C_{16})$ alkyl or trialkylsilyl.

In one embodiment, Y is $(C_{12}-C_{100})$ aralkyl, $(C_{12}-C_{100})$ aryl, $(C_{12}-C_{100})$ alkyl, or $(C_{12}-C_{100})$ dialkylether (alkyl-O-alkyl), and wherein each may be linear or branched, saturated or unsaturated, and optionally substituted with $(C_1-C_4)$ alkyl, $(C_1-C_4)$ alkoxy, $(C_7-C_{16})$ aryl, $(C_7-C_{16})$ aralkyl, nitrile, amine, $NO_2$, alkoxy, or thioalkyl.

The term "aryl," as used herein, refers to at least one aromatic ring, and may also refer to two or more aromatic rings. It is understood that an aryl group used as "Y," as described herein, would be at least divalent.

The term "alkyl," as used herein, refers to at least one aliphatic group, and may also refer to two or more aliphatic groups. The alkyl group may be linear, branched, cyclic, or a combination thereof, and saturated or unsaturated. It is understood that an alkyl group used as "Y," as described herein, would be at least divalent.

The term "alkyl" is understood to include both straight chain aliphatic hydrocarbon groups, (for example, methyl (Me), ethyl (Et), n-propyl (Pr), n-butyl (Bu), n-pentyl, n-hexyl, etc.), branched aliphatic hydrocarbon groups (for example, isopropyl, tert-butyl, etc.) and carbon based non-aromatic rings, aliphatic hydrocarbon groups. Here, "alkyl" refers to saturated linear, branched, cyclic, or combinations thereof, aliphatic hydrocarbon groups, and unsaturated, linear, branched, cyclic, or combinations thereof, aliphatic hydrocarbon groups.

The term "aralkyl," as used herein, refers to at least one aromatic ring, and also at least one alkyl group. It is understood that an aralkyl group used as "Y," as described herein, would be at least divalent. The term "aralkyl" is understood to mean an aryl group bonded to an alkyl.

While not shown in Formula 1, it will be understood that the subject compounds include their corresponding Lewis base adducts (for example, with solvent molecules tetrahydrofurane, dieethylether, dimethoxyethane coordinated with silicon atoms).

The term "alkoxy" is understood to include methoxy (MeO), ethoxy (EtO), propoxy (PrO), butoxy (BuO), isopropoxy, isobutoxy, pentoxy.

The term "aryl" is understood to include phenyls, biphenyls and other benzenoid compounds, each optionally substituted with alkyl, alkoxy, hydroxyl, or other heteroatoms, such as nitrogen, sulfur and phosphorous.

The designation of $(C_a-C_b)$, for example $(C_{12}-C_{100})$, as used herein, is intended to mean a range of carbon atoms from a to b, and includes all individual values and subranges from a to b.

More preferably, the subject modifier is selected from the class defined by Formula 2:

AS—Y—Z    (Formula 2), wherein
Y is $(C_{12}-C_{100})$ alkyl, $(C_{12}-C_{100})$ aralkyl, or $(C_{12}-C_{100})$ aryl;
S is sulfur;
A is hydrogen, —(S)$_p$—R1 or —SiR2R3R4;

Z is SH, —S—SiR2R3R4, —S—(S)$_p$—R8, —NR9R10, —NR11COR12, or —COOR14;

p is the number one, two, three, four or five; and

R1, R2, R3, R4, R8, R9, R10, R11, R12 and R14 are the same or different, and are each independently selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl. The hydrocarbyl groups are each independently selected from ($C_1$-$C_{16}$) alkyl, ($C_6$-$C_{16}$) aryl, or ($C_7$-$C_{16}$) aralkyl. Preferably R1, R2, R3, R4, R8, R9, R10, R11, R12 and R14 are the same or different, and are each independently selected from hydrogen (H), ($C_1$-$C_{16}$) alkyl or ($C_1$-$C_{16}$) trialkylsilyl; and alkyl especially includes Me, Et, Pr and Bu. While not shown in Formula 2, it will be understood that the subject compounds include their corresponding Lewis base adducts (for example, with solvent molecules tetrahydrofurane, dieethylether, dimethoxyethane coordinated with silicon atoms).

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl.

Even more preferably, the subject modifier is selected from the class defined by Formula 3:

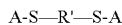
    A-S—R'—S-A    (Formula 3), wherein

R' is ($C_{12}$-$C_{100}$) alkyl, which is linear or branched, ($C_{12}$-$C_{100}$) aralkyl, or ($C_{12}$-$C_{100}$) aryl, preferably ($C_{15}$-$C_{50}$) alkyl, which is linear or branched, and more preferably ($C_{15}$-$C_{50}$) alkyl, which is linear;

S is sulfur;

A is hydrogen, —S—(S)$_p$—R1 or —SiR2R3R4;

p is the number one two or three; and

R1, R2, R3 and R4 are the same or different, and are each independently selected from ($C_1$-$C_{16}$) alkyl, ($C_6$-$C_{16}$) aryl or ($C_7$-$C_{16}$) aralkyl. Preferably R1, R2, R3 and R4 are the same or different, and are each independently selected from ($C_1$-$C_{16}$) alkyl, preferably ($C_1$-$C_8$) alkyl, and more preferably ($C_1$-$C_5$) alkyl, especially including Me, Et, Pr and Bu. While not shown in Formula 3, it will be understood that the subject compounds include their corresponding Lewis base adducts (for example, with solvent molecules tetrahydrofurane, dieethylether, dimethoxyethane coordinated with silicon atoms).

It is understood that "R'," as described herein, would be at least divalent.

In another embodiment, the subject modifier is selected from the class defined by Formula 3a:

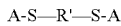
    A-S—R'—S-A    (Formula 3a), wherein

R' is ($C_{12}$-$C_{100}$) alkyl, which is linear or branched, ($C_{12}$-$C_{100}$) aralkyl, or ($C_{12}$-$C_{100}$) aryl, preferably ($C_{15}$-$C_{50}$) alkyl, which is linear or branched, and more preferably ($C_{15}$-$C_{50}$) alkyl, which is linear;

S is sulfur;

A is hydrogen;

p is the number one two or three; and

R1, R2, R3 and R4 are the same or different, and are each independently selected from ($C_1$-$C_{16}$) alkyl, ($C_6$-$C_{16}$) aryl or ($C_7$-$C_{16}$) aralkyl. Preferably R1, R2, R3 and R4 are the same or different, and are each independently selected from ($C_1$-$C_{16}$) alkyl, preferably ($C_1$-$C_8$) alkyl, and more preferably ($C_1$-$C_5$) alkyl, especially including Me, Et, Pr and Bu. While not shown in Formula 3a, it will be understood that the subject compounds include their corresponding Lewis base adducts (for example, with solvent molecules tetrahydrofurane, dieethylether, dimethoxyethane coordinated with silicon atoms).

In another embodiment, the subject modifier is selected from the class defined by Formula 3b:

A-S—R'—S-A    (Formula 3b), wherein

R' is ($C_{12}$-$C_{100}$) alkyl, which is linear or branched, ($C_{12}$-$C_{100}$) aralkyl, or ($C_{12}$-$C_{100}$) aryl, preferably ($C_{15}$-$C_{50}$) alkyl, which is linear or branched, and more preferably ($C_{15}$-$C_{50}$) alkyl, which is linear;

S is sulfur;

A is —S—(S)$_p$—R1;

p is the number one two or three; and

R1, R2, R3 and R4 are the same or different, and are each independently selected from ($C_1$-$C_{16}$) alkyl, ($C_6$-$C_{16}$) aryl and ($C_7$-$C_{16}$) aralkyl. Preferably R1, R2, R3 and R4 are the same or different, and are each independently selected from ($C_1$-$C_{16}$) alkyl, preferably ($C_1$-$C_8$) alkyl, and more preferably ($C_1$-$C_5$) alkyl, and especially including Me, Et, Pr and Bu. While not shown in Formula 3b, it will be understood that the subject compounds include their corresponding Lewis base adducts (for example, with solvent molecules tetrahydrofurane, dieethylether, dimethoxyethane coordinated with silicon atoms).

In another embodiment, the subject modifier is selected from the class defined by Formula 3c:

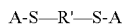
    A-S—R'—S-A    (Formula 3c), wherein

R' is ($C_{12}$-$C_{100}$) alkyl, which is linear or branched, ($C_{12}$-$C_{100}$) aralkyl, or ($C_{12}$-$C_{100}$) aryl, preferably ($C_{15}$-$C_{50}$) alkyl, which is linear or branched, and more preferably ($C_{15}$-$C_{50}$) alkyl, which is linear;

S is sulfur;

A is —SiR2R3R4;

p is the number one two or three; and

R1, R2, R3 and R4 are the same or different, and are each independently selected from ($C_1$-$C_{16}$) alkyl, ($C_6$-$C_{16}$) aryl and ($C_7$-$C_{16}$) aralkyl. Preferably R1, R2, R3 and R4 are the same or different, and are each independently selected from ($C_1$-$C_{16}$) alkyl, preferably ($C_1$-$C_8$) alkyl, and more preferably ($C_1$-$C_5$) alkyl, and especially including Me, Et, Pr and Bu. While not shown in Formula 3c, it will be understood that the subject compounds include their corresponding Lewis base adducts (for example, with solvent molecules tetrahydrofurane, dieethylether, dimethoxyethane coordinated with silicon atoms).

Specific preferred species of the subject modifier include the compounds (and their corresponding Lewis base adducts which are not shown) represented by the following formulae: $Me_3Si$—S—$(CH_2)_{18}$—S—$SiMe_3$, $Et_3Si$—S—$(CH_2)_{18}$—S—$SiEt_3$, $(iPr)_3Si$—S—$(CH_2)_{18}$—S—$Si(iPr)_3$, $tBu(Me)_2Si$—S—$(CH_2)_{18}$—S—$Si(Me)_2tBu$, $nBu(Me)_2Si$—S—$(CH_2)_{18}$—S—$Si(Me)_2nBu$, $Ph(Me)_2Si$—S—$(CH_2)_{18}$—S—$Si(Me)_2Ph$, $Bz(Me)_2Si$—S—$(CH_2)_{18}$—S—$Si(Me)_2Bz$, $(Ph)_3Si$—S—$(CH_2)_{18}$—S—$Si(Ph)_3$, H—S—$(CH_2)_{18}$—S—$SiMe_3$, H—S—$(CH_2)_{18}$—S—$SiEt_3$, H—S—$(CH_2)_{18}$—S—$Si(iPO_3$, H—S—$(CH_2)_{18}$—S—$Si(Ph)_3$, H—S—$(CH_2)_{18}$—S—$Si(Me)_2tBu$, H—S—$(CH_2)_{18}$—S—$Si(Me)_2nBu$, H—S—$(CH_2)_{18}$—S—$Si(Me)_2Ph$, H—S—$(CH_2)_{18}$—S—$Si(Me)_2Bz$, H—S—$(CH_2)_{18}$—S—H, H—S—S—$(CH_2)_{18}$-S—S—H, Me-S—S—$(CH_2)_{18}$—S—S—Me, Et-S—S—$(CH_2)_{18}$—S—S-Et, iPr—S—S—$(CH_2)_{18}$—S—S-iPr, nBu-S—S—$(CH_2)_{18}$—S—S-nBu, tBu-S—S—$(CH_2)_{18}$—S—S-tBu, $Me_3Si$—S—$C_6H_{10}$—$C(Me)_2$-$C_6H_{10}$—S—$SiMe_3$, $Et_3Si$—S—$C_6H_{10}$—$C(Me)_2$-$C_6H_{10}$—S—$SiEt_3$, $(iPr)_3Si$—

S—$C_6H_{10}$—$C(Me)_2$-$C_6H_{10}$—S—$Si(iPr)_3$, $tBu(Me)_2Si$—S—$C_6H_{10}$—$C(Me)_2$-$C_6H_{10}$—S—$Si(Me)_2tBu$, $nBu(Me)_2Si$—S—$C_6H_{10}$—$C(Me)_2$-$C_6H_{10}$—S—$Si(Me)_2nBu$, $Ph(Me)_2Si$—S—$C_6H_{10}$—$C(Me)_2$—$C_6H_{10}$—S—$Si(Me)_2Ph$, $Bz(Me)_2Si$—S—$C_6H_{10}$—$C(Me)_2$-$C_6H_{10}$—S—$Si(Me)_2Bz$, $(Ph)_3Si$—S—$C_6H_{10}$—$C(Me)_2$-$C_6H_{10}$—S—$Si(Ph)_3$, H—S—$C_6H_{10}$—$C(Me)_2$-$C_6H_{10}$—S—$SiMe_3$, H—S—$C_6H_{10}$—$C(Me)_2$-$C_6H_{10}$—S—$SiEt_3$, H—S—$C_6H_{10}$—$C(Me)_2$-$C_6H_{10}$—S—$Si(iPO_3$, H—S—$C_6H_{10}$—$C(Me)_2$-$C_6H_{10}$—S—$Si(Ph)_3$, H—S—$C_6H_{10}$—$C(Me)_2$-$C_6H_{10}$—S—$Si(Me)_2tBu$, H—S—$C_6H_{10}$—$C(Me)_2$-$C_6H_{10}$—S—$Si(Me)_2nBu$, H—S—$C_6H_{10}$—$C(Me)_2$-$C_6H_{10}$—S—$Si(Me)_2Ph$, H—S—$C_6H_{10}$—$C(Me)_2$-$C_6H_{10}$—S—$Si(Me)_2Bz$, H—S—$C_6H_{10}$—$C(Me)_2$-$C_6H_{10}$—S—H, H—S—S—$C_6H_{10}$—$C(Me)_2$-$C_6H_{10}$—S—S—H, Me-S—S—$C_6H_{10}$—$C(Me)_2$-$C_6H_{10}$—S—S-Me, Et-S—S—$C_6H_{10}C(Me)_2$-$C_6H_{10}$—S—S-Et, iPr—S—S—$C_6H_{10}$—$C(Me)_2$-$C_6H_{10}$—S—S-iPr, nBu-S—S—$C_6H_{10}$—$C(Me)_2$-$C_6H_{10}$—S—S-nBu, tBu-S—S—$C_6H_{10}$—$C(Me)_2$-$C_6H_{10}$—S—S-tBu, $Me_3Si$—S—$C_6H_4$—$C(Me)_2$-$C_6H_4$—S—$SiMe_3$, $Et_3Si$—S—$C_6H_4$—$C(Me)_2$-$C_6H_4$—S—$SiEt_3$, $(iPr)_3Si$—S—$C_6H_4$—$C(Me)_2$-$C_6H_4$—S—$Si(iPr)_3$, $tBu(Me)_2Si$—S—$C_6H_4$—$C(Me)_2$-$C_6H_4$—S—$Si(Me)_2tBu$, $nBu(Me)_2Si$—S—$C_6H_4$—$C(Me)_2$—$C_6H_4$—S—$Si(Me)_2nBu$, $Ph(Me)_2Si$—S—$C_6H_4$—$C(Me)_2$-$C_6H_4$—S—$Si(Me)_2Ph$, $Bz(Me)_2Si$—S—$C_6H_4$—$C(Me)_2$-$C_6H_4$—S—$Si(Me)_2Bz$, $(Ph)_3Si$—S—$C_6H_4$—$C(Me)_2$-$C_6H_4$—S—$Si(Ph)_3$, H—S—$C_6H_4$—$C(Me)_2$-$C_6H_4$—S—$SiMe_3$, H—S—$C_6H_4$—$C(Me)_2$-$C_6H_4$—S—$SiEt_3$, H—S—$C_6H_4$—$C(Me)_2$-$C_6H_4$—S—$Si(iPr)_3$, H—S—$C_6H_4$—$C(Me)_2$-$C_6H_4$—S—$Si(Ph)_3$, H—S—$C_6H_4$—$C(Me)_2$-$C_6H_4$—S—$Si(Me)_2tBu$, H—S—$C_6H_4$—$C(Me)_2$-$C_6H_4$—S—$Si(Me)_2nBu$, H—S—$C_6H_4$—$C(Me)_2$-$C_6H_4$—S—$Si(Me)_2Ph$, H—S—$C_6H_4$—$C(Me)_2$-$C_6H_4$—S—$Si(Me)_2Bz$, H—S—$C_6H_4$—$C(Me)_2$-$C_6H_4$—S—H, H—S—S—$C_6H_4$—$C(Me)_2$-$C_6H_4$—S—S—H, Me-S—S—$C_6H_4$—$C(Me)_2$-$C_6H_4$—S—S-Me, Et-S—S—$C_6H_4$—$C(Me)_2$-$C_6H_4$—S—S-Et, iPr—S—S—$C_6H_4$—$C(Me)_2$-$C_6H_4$—S—S-iPr, nBu-S—S—$C_6H_4$—$C(Me)_2$-$C_6H_4$—S—S-nBu, and tBu-S—S—$C_6H_4$—$C(Me)_2$-$C_6H_4$—S—S-tBu. In the above formulae, the notation "Bz" refers to benzyl (—$CH_2$-Ph or —$CH_2$—$C_6H_5$).

The modifiers of the present invention may be prepared for example by reacting a dihalide compound according to Formula 4 with thiourea, giving the reaction product according to Formula 5, followed by a hydrolysis, giving hydrolysis product according to Formula 6.

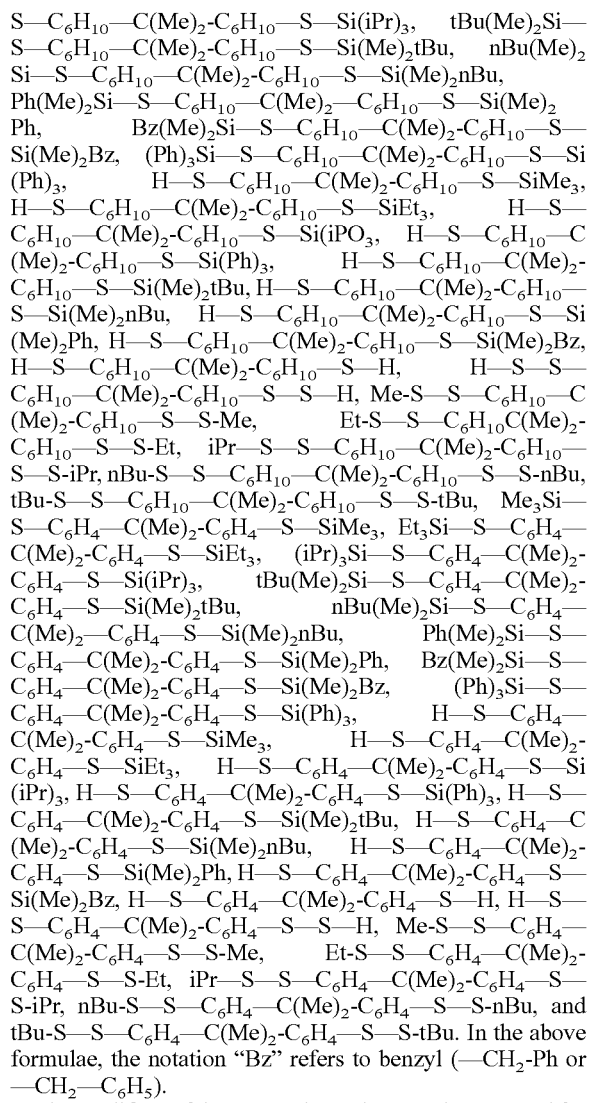

$$X—R'—X, \quad \text{(Formula 4)}$$

(Formula 5)

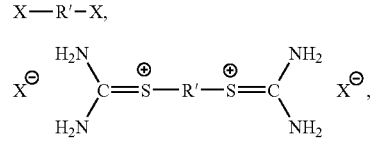

$$HS—R'—SH, \quad \text{(Formula 6)}$$

In the above formula, the symbol R' has the same meaning, as defined with respect to Formula 2, and wherein
S is sulfur,
H is hydrogen,
X is fluorine, chlorine or bromine atom, and
N is nitrogen.

A compound according to Formula 6, can optionally be reacted with a compound according to Formula 7, replacing one or two hydrogen atoms by —$SiR2R3R4$ groups.

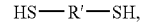

$$QSiR2R3R4 \quad \text{(Formula 7)},$$

wherein the symbol R2, R3 and R4 have the same meaning as defined with respect to Formula 2, and wherein
Q is a fluorine, chlorine or bromine atom, and
Si is silicon.

The modifier may be added intermittently or continuously during the polymerization, but is preferably added at a conversion rate of the polymerization of more than 90 percent. Preferably, the majority of the polymer chain ends are terminated prior to the addition of the backbone modifier; that is, the living polymer chain ends are not present and not capable of reacting with the backbone modifier in a polymer chain end modification reaction. The addition of the backbone modification agent may be before, after, or during, the addition of a coupling agent (if used), or before, after, or during, the addition of a chain-end modifier (if used), or before, after, or during, the addition of a termination agent (if used). Preferably the backbone modification agent is added after the addition of the coupling agent (if used), the chain-end modifier (if used) and the termination agent (if used). In some embodiments, more than a third of the living polymer chain ends are reacted with a coupling agent(s) first, followed by the addition of a chain-end modifier, prior to addition of the backbone modifier. The backbone modifier may be directly added into the polymer solution without dilution; however, it may be beneficial to provide addition of the backbone modifier in solution, such as an inert solvent (for example cyclohexane).

The amount of backbone modifier added to the polymerization varies depending upon the monomer species, backbone modifier species, reaction conditions, and desired end properties, but is generally from 0.005 to 10 weight percentage, preferably from 0.04 to 5 weight percentage, and most preferably from 0.1 to 3 weight percentage, based on the weight of the "dry" polymer. "Dry" characterizes the solvent-free, oil-free, filler-free and water free polymer. The backbone modifier addition may be carried out in a temperature range from 0° C. to 150° C., preferably from 15° C. to 100° C., and even more preferably from 25° C. and 80° C. The polymer may be contacted with backbone modification agent for a period ranging from a few seconds to one hour, preferably from 1 to 15 minutes, in a temperature range from 0° C. to 150° C., preferably from 15° C. to 100° C., and even more preferably from 25° C. to 80° C.

There is no limitation for the duration and for the moment of the backbone functionalization reaction. The polymer backbone functionalization can be performed partially or completely after the addition of the backbone modifier to the polymer solution, during the polymer work-up process, in the course of the polymer compounding or polymer vulcanization process. It is however essential to distribute the backbone modifier compound in the polymer solution prior to the polymer work up. The backbone modifier compound has a relatively high molecular weight, and thus can hardly be removed from the polymer solution, or from the solvent free polymer, in the course of the polymer work-up process, such as, for example, but not limited to, a polymer steam stripping process.

The backbone modification reaction is believed, at least partially, to result in a backbone modified uncrosslinked elastomeric polymer according to Formula 8, through addition of at least one sulfur atom of the modifier compound, according to Formula 1, to an olefinic bond of the elastomeric polymer chain. The modification reaction is assumed to involve an intermediary formation of thionyl radicals, such as suggested by reference (10) and (11) ((10) Singer, H. et al., Plaste and Kautschuk, 26/2 (1979), 72-76; (11) Lebedev et al., Acta Polymerica, 30/8 (1979) 496-502).

$$(D)\text{-}(S\text{---}Y\text{-}Zm)o \qquad \text{(Formula 8)},$$

wherein

D is an uncrosslinked elastomeric polymer chain, o represents the number of backbone functionalities and varies from 1 to 2000, and all other symbols are as previous defined with respect to Formula 1. While not shown in Formula 8, it will be understood that the subject compound(s) include their corresponding Lewis base adducts.

In a second reaction step, or simultaneously, the Z groups, according to formula 8, either react with another olefinic bond of an elastomeric polymer chain and/or react with fillers (such as silica and/or carbon black) present or other components present in elastomeric polymer compounds forming elastomeric polymer compositions. This interaction is believed to result in the formation of bonds, or in the case of some fillers, electrostatic interactions, which result in a more homogeneous distribution of the filler particles within elastomeric polymer compositions.

In some preferred embodiments, the polymer chain ends may be partially or completely coupled, via reaction, with the aforementioned coupling agent(s), prior to the addition of the backbone modifier agent. In other preferred embodiments, polymer chain ends may be partially coupled via reaction with the aforementioned coupling agent(s), and partially linked to end-capping agents, prior to the addition of the backbone modifier agent. Again in other preferred embodiments, polymer chain ends may be exclusively coupled with aforementioned end-capping agents, prior to the addition of the backbone modifier agent.

The trialkylsilyl ($-SiR_2R_3R_4$) group of Formula 2 is believed to function as a protective group, which prevents unintended subsequent reaction. This "protective" trialkylsilyl ($-SiR_3$) group may be removed by exposure to chemical compounds containing —OH groups, such as water, inorganic acids or organic acids, (for example hydrochloric acid, sulfuric acid or carboxylic acids), thus forming an "un-protected" thiol (—SH) group. Such conditions are typically present during polymer compounding or polymer vulcanization. Depending on the polymer "work up" conditions, both the unprotected and protected modified uncrosslinked elastomeric polymers may be present. For example, steam stripping of the polymer solution containing the modified polymer, according to Formula 3, will remove a percentage of the protecting trialkyl silyl groups, resulting in the unprotected form with the thiol (—SH) group exposed. Alternatively, a "water-free" work up procedure can enable the preparation of the unmodified polymers containing very well distributed modifier compound according to Formula 3.

The alkylthio ($-S-(S)_p-R_1$) group of Formula 2 is believed to function as a protective group, which prevents unintended subsequent reaction. The sulfur-sulfur bonds of the "protective" alkyldithio (p=1), alkyltrithio (p=2) or alkyltetrathio (p=3) group ($-S-(S)_p-R1$) are known to be thermolabile, and therefore can be cleaved by exposure to an elevated temperature, such as present during polymer work-up, polymer compounding or during vulcanization of the polymer-filler compounds. Depending on the number p of sulfur atoms, a desired cleavage temperature can be selected.

The use of a protective group may be useful when the reaction of the backbone modifier of the invention with the uncrosslinked elastomeric polymer source, in solution, or in the course of the polymer workup procedure, is undesired. This is the case, when polymer chain cross-linking, leading to an increased viscosity of the polymer solution, and to an increased viscosity of the solvent free polymer, or in some cases, gel formation, need to be avoided. A lower polymer viscosity simplifies the polymer work up procedure and the polymer processing in case of the preparation of uncrosslinked elastomeric polymer—filler compounds. Therefore with respect to an economic process, meaning a fast polymer-work up and polymer compounding process, rubber materials with high polymer viscosities, such as, for example, polymer Mooney viscosities higher than 80, preferably higher than 70, are not desired. Accordingly, for example, if the viscosity of the polymer in solution, prior to the addition of the backbone modifier, is already close to the above mentioned Mooney values, the use of a protective group is recommended.

To the uncrosslinked elastomeric polymer, preferably is added a sulfide group containing backbone modifier (for example $C_{18}$-dithiol), in the amount from 0.0050 to 0.70 mmol/gram of uncrosslinked elastomeric polymer, preferably from 0.0080 to 0.5 mmol/gram, and more preferably from 0.010 to 0.35 mmol/gram of polymer. For most applications, the backbone modifier is added preferably to a polymer comprising a homopolymer derived from a conjugated diolefin, a copolymer derived from a conjugated diolefin monomer with an aromatic vinyl monomer, and/or a terpolymer of one or two types of conjugated diolefins with one or two types of aromatic vinyl compounds. More preferably, the backbone modifier is added to a polymer, which is represented by copolymer of a conjugated diolefin monomer with an aromatic vinyl monomer, for example a copolymer of butadiene with styrene.

Although there are no specific limitations regarding the content of 1,2-bonds and/or 3,4-bonds (hereinafter called "vinyl bonds") of the conjugation diolefin portion of the elastomeric polymer, for most applications, the vinyl bond content is preferably from 10 to 90 weight percentage, and particularly preferably from 15 to 80 weight percentage (based on total weight of elastomeric polymer). If the vinyl bond content in an elastomeric polymer is less than 10 weight percentage, the resulting product may have inferior wet skid resistance. If the vinyl content in the elastomeric polymer exceeds 90 weight percentage vinyl bonds, the product may exhibit compromised tensile strength and abrasion resistance, and relatively large hysteresis loss.

Although there are no specific limitations regarding the amount of aromatic vinyl monomer used in the subject modified elastomeric polymer, in most applications the aromatic vinyl monomers comprise from 5 to 60 weight percentage of the total monomer content, and more preferably from 10 to 50 weight percentage (based on total weight of elastomeric polymer). Values less than 5 weight percentage can lead to reduced wet skid properties, abrasion resistance, and tensile strength; whereas values more than 60 weight percentage lead to increased hysteresis loss. The modified elastomeric polymer may be a block or random copolymer, but is preferably 40 weight percentage, or more, of the aromatic vinyl compound units are linked singly, and 10 weight percentage, or less, are of "blocks" in which eight or more aromatic vinyl compounds are linked successively. Copolymers falling outside this range often exhibit increased hysteresis. The length of successively linked aromatic vinyl units can be measured by an ozonolysis-gel permeation chromatography method developed by Tanaka, et al. (Polymer, Vol. 22, Pages 1721-1723 (1981)).

While dependant upon the specific polymer and desired end use application, the modified polymers of the present invention preferably have Mooney viscosity (ML 1+4, 100° C., as measured in accordance with ASTM D 1646 (2004)) in the range from 20 to 150, and preferably from 30 to 100, using a Monsanto MV2000 instrument.) If the Mooney viscosity (ML 1+4, 100° C.) is less than 20, abrasion resistance and hysteresis loss properties are compromised. Moreover, tack and cold flow of the uncrosslinked elastomeric polymer are increased, resulting in difficult handling, poor green strength and poor dimensional stability during storage. If the Mooney viscosity (ML 1+4, 100° C.) of the polymer is more than 150, processability (filler incorporation and heat build up in the internal mixer, banding on the roll mill, extrusion rate, extrudate die swell, smoothness, etc.) is impaired, and the cost of processing increases.

The preferred molecular weight distribution of the subject modified polymer, represented by the ratio of the weight average molecular weight to the number average molecular weight, (Mw/Mn), ranges preferably from 1.3 to 3.0. Processability of the polymer is impaired, if the Mw/Mn is less than 1.3. Poor processability not only increases cost of production, but also impairs blending characteristics of components, such as insufficient dispersion of fillers and other additives, which may result in poor physical properties. If Mw/Mn is more than 3.0, the content of low molecular weight components increases and hysteresis loss increases.

Extender oils may be used in combination with the subject uncrosslinked elastomeric polymers to reduce viscosity or Mooney values. Applicable extender oils include mineral oils which are mixtures of aromatic-type oil, alicyclic-type oil, and aliphatic-type oil, and are classified as an aromatic-type extender oil, alicyclic-type extender oil, or aliphatic-type extender oil. Among these, aromatic-type mineral oil having a viscosity gravity constant (V.G.C. value) of 0.900-1.049 (aromatic oil) and an alicyclic-type mineral oil having a V.G.C. value of 0.850-0.899 (naphthenic oil) are particularly preferable to ensure optimal low temperature hysteresis loss properties, resulting in excellent wet skid resistance. Such extension of modified polymer of the subject invention with extender oil ensures homogeneous dispersion of fillers, such as carbon black and silica, in the polymer, and improves processability and various properties of vulcanized products. The amount of extender oil used in the present invention is from 0 to 100 parts by weight, preferably from 0 to 80 parts by weight, and more preferably from 0 to 70 parts by weight, for 100 parts by weight modified uncrosslinked elastomeric polymer. When the extender oil is added to the polymer solution, the timing of addition should be after modification of the polymer or termination of the polymerization, for example, after the addition of the modifier or polymerization termination agent. After the addition of extender oil, the oil-extended polymer is obtained by separating the polymer from solvent by a direct drying method or steam stripping, drying the rubber using a vacuum dryer, hot-air dryer, roller, or the like. By way of example, U.S. Publication 2005/0159513 discloses an oil extended rubber composition comprising a solution-polymerized uncrosslinked elastomeric polymer coupled with a silicon or tin coupling agent, and a low polycyclic aromatic oil.

In an important embodiment of the present invention, the subject modified elastomeric polymer is combined and reacted with filler(s) and vulcanization agent, and, optionally, additional constituents, including, but not limited to, accelerators, coupling agents, and unmodified uncrosslinked elastomeric polymers (that is conventional uncrosslinked elastomeric polymers that have not been reacted with the subject modifier, but that have been prepared and terminated as is conventional in the art). The term "uncrosslinked elastomeric polymer composition" is intended to describe the reaction product resulting from this combination. The resulting uncrosslinked elastomeric polymer composition is typically molded into a desired configuration or shape and vulcanized to form cross-linked elastomeric articles comprising cross-linked elastomeric polymer compositions, such as a tire.

The subject modified elastomeric polymer (include oil extended embodiments) preferably comprises at least 30 weight percentage of the total elastomeric polymer present, and more preferably at least 50 weight percentage. The remaining portion of the elastomeric polymer is unmodified elastomeric polymer. Preferred unmodified elastomeric polymers include: cis-1,4-isoprene polymer, natural rubber, 3,4-isoprene polymer, styrene/butadiene copolymer polymer, styrene/isoprene/butadiene terpolymer, cis-1,4-butadiene polymer, trans-1,4-butadiene polymer, low to high vinyl butadiene polymers (having a vinyl content of 10-90%), acrylonitrile/butadiene copolymers, and chloroprene polymers. Of these, styrene-butadiene copolymer, natural rubbers, polyisoprene, and polybutadiene are preferable. It is desirable that the unmodified polymers have a Mooney viscosity (ML 1+4, 100° C. (ASTM D 1646 (2004), as discussed above) in the range from 20 to 200, and preferably from 25 to 150. The addition of unmodified polymers in the above range ensures manufacturing of the elastomeric composition of the present invention at a low cost, without substantially impairing its characteristics.

The subject elastomeric composition preferably includes fillers, which serve as reinforcement agents. Carbon black, silica, carbon-silica dual-phase-filler, clay, calcium carbonate, magnesium carbonate, are examples. Of these, the combined use of carbon black and silica, the use of carbon-silica dual-phase-fillers alone, or the combined use of carbon-silica dual-phase-filler and carbon black and/or silica are preferable. Carbon black is manufactured by a furnace method and having a nitrogen adsorption specific surface area of 50-200 $m^2/g$ and DBP oil absorption of 80-200 ml/100 grams, for example, FEF; HAF, ISAF, or SAF class carbon black, is preferable. High agglomeration type carbon black is particularly preferable. Carbon black is typically added in an amount from 2 to 100 parts by weight, and preferably from 5 to 100 parts by weight, more preferably 10 to 100 parts by weight, and even more preferably 10 to 95 parts by weight, for 100 parts by weight of the total elastomeric polymer.

Examples of silica fillers include the following: wet process silica, dry process silica, and synthetic silicate-type silica. Silica with a small particle diameter exhibits a high reinforcing effect. Small diameter, high agglomeration-type silica (that is having a large surface area and high oil absorptivity) exhibits excellent dispersability in the elastomeric polymer composition, representing desirable properties, and superior processability. An average particle diameter of silica, in terms of a primary particle diameter, is preferably from 5 to 60 µm, and more preferably from 10 to 35 µm. Moreover, the specific surface area of the silica particles (measured by the BET method) is preferably from 45 to 280 $m^2/g$. Silica is added in an amount from 10 to 100 parts by weight, preferably 30 to 100 parts by weight, and even more preferably from 30 to 95 parts by weight, for 100 parts by weight of the total elastomeric polymer.

Carbon black and silica may be added together, in which case the total amount of carbon black and silica added, is from 30 to 100 parts by weight, and preferably from 30 to 95 parts by weight for 100 parts by weight of the total elastomeric polymer. So long as such fillers are homogeneously dispersed in the elastomeric composition, increasing quantities (within the above cited ranges) result in compositions having excellent rolling and extruding processability, and vulcanized products exhibiting favorable hysteresis loss properties, rolling resistance, improved wet skid resistance, abrasion resistance, and tensile strength.

Carbon-silica dual-phase-filler may be used either independently or in combination with carbon black and/or silica in the present invention. Carbon-silica dual-phase-filler can exhibit the same effects as those obtained by the combined use of carbon black and silica, even in the case where this is added alone. Carbon-silica dual-phase-filler is so called silica-coated-carbon black made by coating silica over the surface of carbon black, and is commercially available under the trademark CRX2000, CRX2002, or CRX2006 (products of Cabot Co.). Carbon-silica dual-phase-filler is added in the same amounts as previously described with respect to silica. Carbon-silica dual-phase-filler can be used in combinations with other fillers, for example, carbon black, silica, clay, calcium carbonate, and magnesium carbonate. Of these fillers, use of carbon black and silica, either individually or in combination, is preferable.

It is preferable to add a silane coupling agent to the polymer composition when silica or carbon-silica dual-phase-filler is used. The typical amount of a silane coupling agent added is from 1 to 20 parts by weight, and preferably from 5 to 15 parts by weight, for 100 parts by weight of the total amount of silica and/or carbon-silica dual-phase-filler. A silane coupling agent, which has both a functional group reactive with silica surface, such as, for example, but not limited to, an alkoxysilyl group, and a functional group reactive with a carbon-carbon double bond of polymer, such as polysulfide group, mercapto group, or epoxy group, in the molecule is preferable, including bis-(3-triethoxysilylpropyl)tetrasulfide, bis-(3-triethoxysilylpropyl)disulfide, bis-(2-triethoxysilylethyl) tetrasulfide, bis-(2-triethoxysilylethyl)disulfide, 3-mercaptopropyltrimethoxysilane, 3-triethoxysilylpropyl-N,N-dimethylthiocarbamoyltetrasulfide, 3-triethoxysilylpropylbenzothiazole tetrasulfide, 3-octanoylthio-1-propyltriethoxysilane (NXT silane, © Crompton Corporation). The use of such a silane coupling agent increases the reinforcing effect brought about by the combined use of carbon black and silica or the use of carbon-silica dual-phase-filler.

Sulfur-containing compounds and peroxides are the most common vulcanizing agents. A vulcanizing accelerator of sulfene amide-type, guanidine-type, or thiuram-type can be used together with a vulcanizing agent, as required. Other additives such as zinc white, vulcanization auxiliaries, aging preventives, processing adjuvants, may be optionally added. A vulcanizing agent is typically added to the polymer composition in an amount from 0.5 to 10 parts by weight, and preferably from 1 to 6 parts by weight, for 100 parts by weight of the total elastomeric polymer. Additional information regarding vulcanizing agents can be found in Kirk-Othmer, Encyclopedia of Chemical technology $3^{rd}$, Ed, Wiley Interscience, N.Y. 1982, volume 20, pp. 365-468, specifically "Vulcanizing Agents and Auxiliary Materials" pp. 390-402.

The elastomeric polymer composition of the present invention can be prepared by kneading the above-described modified elastomeric polymers (including oil extended varieties), unmodified elastomeric polymers (including oil extended varieties), fillers (carbon black, silica, carbon-silica dual-phase-filler, etc.), silane coupling agents, and other additives in a kneader at 140 to 180° C. After cooling, vulcanizing agents such as sulfur, vulcanizing accelerators, are added, and the resulting mixture is blended using a Banbury mixer or open roll mill, formed into a desired shape, and vulcanized at 140 to 180° C., thereby obtaining a vulcanized elastomeric product.

Because the vulcanized elastomeric polymer compositions of the present invention exhibit low rolling resistance, low dynamic heat build up and superior wet skid performance, the elastomeric polymer compositions of the present invention are well suitable for use in preparing tires, tire treads, side walls, and carcasses, as well as other industrial products such as belts, hoses, vibration dampers, and footwear.

The present invention will be explained in more detail by way of examples, which are not intended to be limiting of the present invention.

EXAMPLES

The following Examples are provided in order to further illustrate the invention and are not to be construed as limiting. The Examples include the preparation of the subject modifiers along with comparative modifiers, the preparation and testing of modified elastomeric polymers and the preparation and testing of uncrosslinked as well as of cross-linked elastomeric polymer compositions. Unless stated to the contrary, all parts and percentages are expressed on a weight basis. The term "overnight" refers to a time of approximately 16-18 hours and "room temperature" refers to a temperature of about 20-25° C. The polymerizations were performed under exclusion of moisture and oxygen in a nitrogen atmosphere. Various methods were used to test and measure Examples. A brief description of these techniques is provided.

The ratio between the 1,4-cis-, 1,4-trans- and 1,2-polydiene content of the butadiene or isoprene polymers was determined by IR, $^1$H-NMR- and $^{13}$C-NMR-spectroscopy (NMR (Avance 400 device ($^1$H=400 MHz; $^{13}$C=100 MHz) of Bruker Analytic GmbH). The vinyl content in the conjugated diolefin part was additionally determined by IR absorption spectrum (Morello method, IFS 66 FT-IR spectrometer of Bruker Analytic GmbH). The IR samples were prepared using $CS_2$ as swelling agent.

Bonded styrene content: A calibration curve was prepared by IR absorption spectrum (IR (IFS 66 FT-IR spectrometer of Bruker Analytik GmbH). The IR samples were prepared using $CS_2$ as swelling agent). The styrene content was alternatively determined by NMR technique (NMR (Avance 400 device (1H=400 MHz; $^{13}$C=100 MHz) of Bruker Analytik GmbH)).

Molecular weight distribution (Mw/Mn) was determined from the ratio of polystyrene-reduced weight average molecular weight (Mw) and number average molecular weight (Mn) which were measured by gel permeation chromatograph (SEC with viscosity detection (universal calibration) in THF at room temperature). Mp1 and Mp2 correspond to the molecular weight measured at the first and second maximum peaks of the GPC curve, respectively, of the uncoupled molecular weight fraction.

The glass transition ($T_g$) temperatures were determined by DSC determination. DSC (differential scanning calorimetry) was measured using a DSC 2920 of TA Instruments.

Mooney viscosity was measured according to ASTM D 1646 (2004) with a preheating time of one minute and a rotor operation time of four minutes at a temperature of 100° C. [ML1+4(100° C.)].

Tensile strength, elongation at break and modulus at 300% elongation (Modulus 300) were measured according to ASTM D 412-98A (reapproved 2002) on a Zwick Z010.

Heat build up was measured according to ASTM D 623, method A, on a Doli 'Goodrich'-Flexometer.

Tan δ (60° C.) was measured using the dynamic spectrometer Eplexor 150N manufactured by Gabo Qualimeter Testanlagen GmbH (Germany) applying a compression dynamic strain of 0.2% at a frequency of 2 Hz at 60° C. The smaller the index, the lower is the rolling resistance (lower=better). Tan δ (0° C.) was measured using the same equipment and load conditions at 0° C. The larger the index, the better the wet skid resistance (higher=better). Specimen are vulcanized rubber compounds prepared by combining and compounding the constituents listed below in Table 4 and Table 7, in a 380 cc Banbury mixer and vulcanized at 160° C. for 20 minutes. Vulcanization process data are provided in Tables 5 and 8. In particular, the unvulcanized polymer compound is pressed into disks of 60 mm inner-diameter and 8 mm height. Pressing (about 200 bar pressure) the rubber compound into above metal disk removes air, thus avoiding inclusion of air bubbles, and leads to the formation of visually bubble free, homogeneous compound material. After completion of the vulcanization process (160° C., for 20 minutes to achieve a TC 95 (95% vulcanization conversion), ambient atmosphere), a homogeneous disk of 60 mm diameter and 8 mm height results. A specimen is drilled out of the aforementioned dish, and has a size of 10 mm diameter and 8 mm height.

DIN abrasion was measured according to DIN 53516 (1987-06-01). The larger the index, the lower the wear resistance is (lower=better).

Measurement of unvulcanized rheological properties according to ASTM D 5289-95 (reapproved 2001) using a rotor-less shear rheometer (MDR 2000 E) to measure Scorch Time (TS) and Time to Cure (TC).

The "TC 50" and "TC 90" are the respective times required to achieve 50% and 90% conversion of the vulcanization reaction. The "TS 1" and "TS 2" are the respective times required to increase the torque by 1 dNm or 2 dNm above the respective torque minimum (ML) during vulcanization.

In general, the higher the value for Elongation at Break, Tensile Strength, Modulus 300, and Tan δ at 0° C., the better; whereas the lower the Tan δ at 60° C., Heat Build up, and Abrasion, the better. Preferably TS 1 is >1.5 minute, TS 2 is >2.5 minute, TC 50 is from 3 to 8 minutes, and TC 90 is from 8 to 19 minutes.

Backbone Modifier Preparation: Four backbone modifiers were used in the Examples. The structural formula and method of preparation (or source for obtaining) are provided below. Modifiers 2 to 5 are representative of those of the present invention, the modifier 1 represents a chain-end modifier. Modifier 1 is n-methylpyrrolidone (NMP) purchased from the Aldrich GmbH.

Preparation and Structure of the Backbone Modifiers:
Backbone modifier 2 is represented by Formula M1 below and was prepared as follows.

(Formula M1)

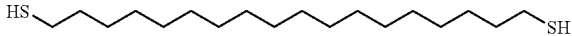

A solution of 154.6 g (0.375 mol) of α,ω-dibromooctadecan and 60 g (0.78 mol) thiourea in 600 mL was refluxed for two hours. To the mixture was added a solution of 160 g of sodium hydroxide in 250 ml water. The resulting mixture was refluxed for additional three hours. Modifier 2 was isolated by acidification of the reaction mixture, and distillative removal of solvent and side products in the vacuum. 89.1 g (0.28 mmol) of modifier 2 were obtained.

Backbone modifier 3 is represented by Formula M2 below and was prepared as follows.

(Formula M2)

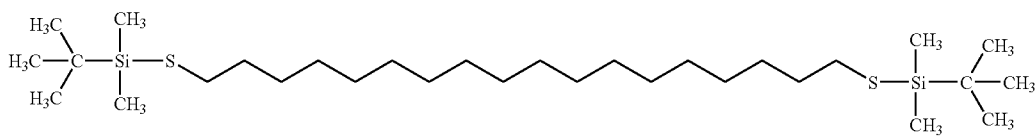

A 250 mL Schlenk flask was charged with 100 g tetrahydrofurane (THF), 0.87 g (110 mmol) lithiumhydride and 17.5 g (55.0 mmol) modifier 2. The mixture was stirred for 24 hours at room temperature, and then stirred for further two hours at 50° C. Tert. butyl-dimethyl-chloro silane (16.6 g, 110 mmol) was dissolved in 50 g THF, and the resulting solution was then added drop wise to the Schlenk flask. The mixture was stirred for 24 hours at room temperature, and then stirred for further two hours at 50° C. The reaction mixture was filtered. Afterwards, all volatile products were removed under vacuum. Modifier 3 (29.0 g, 53 mmol) was recovered.

Backbone modifier 4 is represented by Formula M3 below, and was prepared as described in reference: L. Rapoport, A. Smith, M. S, Newman, *Journal of the American Chemical Society* (1947) 69(3) 693-694 on page 694.

(Formula M3)

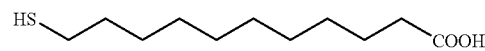

Backbone modifier 5 is represented by Formula M4 below, and was prepared analogous to modifier 4 as described in reference: L. Rapoport, A. Smith, M. S, Newman, *Journal of the American Chemical Society* (1947) 69(3) 693-694 on page 694, using 50.3 g (0.15 mol) ω-bromohexadecylic acid and 12 g (0.156 mol) thiourea.

(Formula M4)

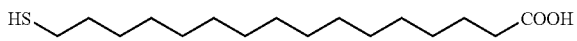

Copolymerization of 1,3-Butadiene with Styrene

Examples 1-16

The co-polymerizations were performed in a double wall 20 liter steel reactor which was first purged with nitrogen, before the addition of organic solvent, monomers, polar coordinator compound, initiator compound or other components. The polymerization reactor was tempered to 40° C., unless stated otherwise. The following components were then added in the following order: cyclohexane solvent (84 weight percent solvent, based on total weight of polymerization components, including solvent, in the reactor at any time prior to, or during, the polymerization, as shown in Table 1); butadiene monomer, styrene monomer, tetramethylethylene diamine (TMEDA), and the mixture was stirred for one hour, followed by titration with n-butyl lithium to remove traces of moisture or other impurities. Additional n-butyl lithium was added to start the polymerization reaction. The polymerization was performed for 80 minutes, not allowing the polymerization temperature to exceed 60° C. Afterwards, 0.5 wt % of the total butadiene monomer amount was added, followed by the addition of tin tetrachloride, unless stated otherwise. The mixture was stirred for 20 minutes. Then, 1.8 wt % of the total butadiene monomer amount was added, followed by the addition of chain-end modifier (1), unless stated otherwise. The mixture was stirred for 45 minutes. For the termination of the polymerization process, the polymer solution was then transferred into a separate double wall, steel reactor containing 1.5 g methanol and 5 g Irganox 1520 as stabilizer for the polymer. This mixture was stirred for 15 minutes. Subsequently, the backbone modifier (2, 3, 4 or 5) was added unless stated otherwise. This mixture was stirred for additional 5 minutes. The resulting polymer solution was then stripped with steam for one hour to remove solvent and other volatiles, and dried in an oven at 70° C. for 30 minutes, and another one to three days, at room temperature.

The resulting polymer composition and several properties are summarized in Tables 1-3 below. Unless otherwise stated, quantities are expressed in mmoles. Examples prepared under identical polymerization conditions (in the same polymerization reactor on the same day by the same operator) are designated with identical letters adjacent to the Example number (for example 3A, 4A).

The use of a dash "-" in the tables below indicates that no constituent was added. The abbreviation "N.M." is intended to mean that no measurement was taken, or that corresponding data was unavailable.

TABLE 2

Polymer Microstructure

| Example | Backbone Modifier | Vinyl content | Styrene content | Styrene Micro Block Content [%] | Styrene Long Block Content [%] |
|---|---|---|---|---|---|
| 1A | — | 44.5 | 21.1 | 3 | 1 |
| 2A | 2 (2 wt %) | 44.5 | 21.1 | 3 | 1 |
| 3B (Ref.) | — | 63.0 | 21.5 | 4 | 1 |
| 4B | 2 (1 wt %) | 63.1 | 21.5 | 4 | 1 |
| 5B | 2 (0.5 wt %) | 63.0 | 21.5 | 4 | 1 |
| 6B | 2 (0.25 wt %) | 63.0 | 21.5 | 4 | 1 |
| 7C (Ref.) | — | 62.7 | 21.2 | 4 | 2 |
| 8C | 4 (0.5 wt %) | 62.7 | 21.2 | 4 | 2 |
| 9D (Ref.) | — | 63.5 | 20.6 | 4 | 2 |
| 10D | 3 (0.2 wt %) | 63.4 | 20.6 | 4 | 1 |
| 11D | 3 (0.4 wt %) | 63.4 | 20.6 | 4 | 1 |
| 12E (Ref.) | — | 63.6 | 20.4 | 3 | <1 |
| 13E | 4 (0.2 wt %) | 64.5 | 20.4 | 5 | 1 |
| 14E | 4 (0.5 wt %) | 64.4 | 20.5 | 5 | 2 |
| 15E | 5 (0.5 wt %) | 64.3 | 20.4 | 4 | 1 |

TABLE 1

Composition of Examples

| Example | Backbone Modifier* | Tin tetrachloride (mmol) | Butadiene (moles) | Styrene (moles) | TMEDA (mmol) | Chain-End Modifier (mmol) | n-Butyl lithium (mmol) |
|---|---|---|---|---|---|---|---|
| 1A | — | 0.456 | 14.3 | 2.01 | 9.13 | (—) | 6.08 |
| 2A | 2 (2 wt %) | 0.912 | 29.07 | 4.03 | 20.3 | (—) | 11.57 |
| 3B (Ref.) | — | 1.565 | 48.98 | 6.71 | 35.55 | (1) 17.56 | 20.96 |
| 4B | 2 (1 wt %) | 1.560 | 48.85 | 6.71 | 35.55 | (1) 17.56 | 20.98 |
| 5B | 2 (0.5 wt %) | 1.567 | 48.88 | 6.70 | 35.54 | (1) 17.56 | 20.93 |
| 6B | 2 (0.25 wt %) | 1.561 | 48.68 | 6.71 | 35.55 | (1) 17.56 | 20.97 |
| 7C (Ref.) | — | 1.734 | 55.25 | 7.63 | 38.90 | (1) 19.34 | 22.93 |
| 8C | 4 (0.5 wt %) | 1.730 | 55.28 | 7.64 | 38.90 | (1) 19.34 | 22.95 |
| 9D (Ref.) | — | 1.651 | 52.49 | 6.97 | 37.13 | (1) 19.12 | 21.85 |
| 10D | 3 (0.2 wt %) | 1.654 | 52.40 | 6.95 | 37.10 | (1) 19.12 | 21.82 |
| 11D | 3 (0.4 wt %) | 1.651 | 52.53 | 6.95 | 37.18 | (1) 19.11 | 21.87 |
| 12E (Ref.) | — | 1.640 | 52.34 | 6.93 | 43.26 | — | 21.93 |
| 13E | 4 (0.2 wt %) | 1.646 | 52.37 | 6.93 | 43.26 | — | 21.93 |
| 14E | 4 (0.5 wt %) | 1.645 | 52.28 | 6.92 | 43.25 | — | 21.93 |
| 15E | 5 (0.5 wt %) | 1.638 | 52.31 | 6.91 | 43.26 | — | 21.93 |

*Modifier amount based on the total amount of polymerization monomers

TABLE 3

Polymer Properties

| Example | Backbone Modifier | Mw | Mn | Mp1 | Tg [° C.] | Mooney viscosity | CR1 | CR2 | Gel Content [%] |
|---|---|---|---|---|---|---|---|---|---|
| 1A | — | 256,000 | 185,000 | 158,000 | −45.8 | 43.8 | 16.9 | 8.9 | 1.75 |
| 2A | 2 (2 wt %) | N.D. | N.D. | N.D. | N.D. | 136.2 | N.D. | N.D. | 36.0 |
| 3B (Ref.) | — | 384,773 | 240,441 | 241,349 | N.M. | 41.3 | 21.5 | 7.8 | 0.9 |
| 4B | 2 (1 wt %) | 422,000 | 242,000 | 161,000 | −26.4 | 73.5 | 15.9 | 24.8 | 1.75 |
| 5B | 2 (0.5 wt %) | 414,000 | 241,000 | 162,000 | −25.7 | 111.3 | 16.0 | 21.3 | 18.2 |
| 6B | 2 (0.25 wt %) | 355,000 | 222,000 | 159,000 | −26.6 | 61.2 | 19.8 | 23.7 | 0.9 |
| 7C (Ref.) | — | 396,755 | 222,759 | 252,885 | N.M. | 56.2 | 19.5 | 11.8 | 0.6 |
| 8C | 4 (0.5 wt %) | 352,000 | 234,000 | 169,000 | −25.8 | 61.2 | 31.0 | 24.1 | 0.7 |
| 9D (Ref.) | — | 300,000 | 200,000 | 156,000 | −25.7 | 51.4 | 20.2 | 20.2 | 1.2 |
| 10D | 3 (0.2 wt %) | 315,000 | 207,000 | 157,000 | −25.7 | 55.6 | 20.5 | 21.0 | 1.4 |
| 11D | 3 (0.4 wt %) | 321,000 | 204,000 | 158,000 | −26.0 | 53.2 | 19.7 | 20.9 | 0.7 |
| 12E (Ref.) | — | 257,000 | 180,000 | 159,000 | −24.9 | 46.7 | 10.3 | 16.4 | 1.1 |
| 13E | 4 (0.2 wt %) | 261,000 | 187,000 | 159,000 | −24.8 | 48.5 | 10.1 | 18.9 | 1.5 |
| 14E | 4 (0.5 wt %) | 272,000 | 185,000 | 159,000 | −24.8 | 48.4 | 10.8 | 18.0 | 1.9 |
| 15E | 5 (0.5 wt %) | 277,000 | 187,000 | 159,000 | −24.8 | 50.1 | 10.5 | 19.3 | 0.8 |

Polymer compositions were prepared by combining and compounding the constituents listed below in Table 4, in a 380 cc Banbury mixer and vulcanized at 160° C. for 20 minutes. Vulcanization process data and physical properties for each elastomeric composition example are provided in Tables 5 and 6.

TABLE 4

Test Formulation

| Compounding | Amount (phr) |
|---|---|
| 1st Stage | |
| Elastomeric Polymer Example (styrene butadiene copolymer) | 100 |
| IRB 7 (international ref. carbon black, Sid Richardson) | 50 |
| Stearic acid | 1.5 |
| Zinc oxide | 3.0 |
| Extender oil (aromatic) | 5.0 |
| 2nd Stage | |
| Sulfur | 1.75 |
| CBS (N-cyclohexyl-2-benzothiazylsulfenamid; Vulcacit CZ/EG, Lanxess AG) | 1.0 |

TABLE 5

Compound Properties

| Example | Backbone Modifier | Compound Mooney | TS 1 [min] | TS 2 [min] | TC 50 [min] | TC 90 [min] |
|---|---|---|---|---|---|---|
| 1A | — | 79.6 | 4.1 | 5.3 | 6.6 | 10.7 |
| 2A | 2 (2 wt %) | 214.0 | 1.2 | 1.7 | 2.7 | 6.8 |
| 3B (Ref.) | — | 95.6 | 5.0 | 5.9 | 7.5 | 14.0 |
| 4B | 2 (1 wt %) | 123.3 | 3.0 | 3.5 | 4.9 | 12.5 |
| 5B | 2 (0.5 wt %) | 105.5 | 4.0 | 4.6 | 6.1 | 12.8 |
| 6B | 2 (0.25 wt %) | 100.5 | 4.4 | 5.0 | 6.5 | 12.9 |

TABLE 6

Vulcanizate Properties

| Ex | Backbone Modifier | Tensile Strength [MPa] | Modulus 300 [MPa] | DIN abrasion 0.5 kg load [mm] | Tear Strength with grain N/mm | Heat build up [° C.] | Tan δ at 0° C. | Tan δ at 60° C. | Tan δ max |
|---|---|---|---|---|---|---|---|---|---|
| 1A (Ref) | — | 20.6 | N.D. | 118 | 13.9 | 97.4 | N.D. | N.D. | N.D. |
| 2A | 2 (2 wt %) | 14.6 | N.D. | 144 | 9.7 | 111.6 | N.D. | N.D. | N.D. |
| 3B (Ref) | — | 17.9 | 14.0 | 141 | 10.7 | 87.8 | 0.5734 | 0.0846 | 1.2348 |
| 4B | 2 (1 wt %) | 15.6 | 16.9 | 141 | 10.3 | 90.6 | 0.5600 | 0.0858 | 1.2517 |
| 5B | 2 (0.5 wt %) | 17.9 | 15.3 | 142 | 10.3 | 87.6 | 0.5788 | 0.0831 | 1.2801 |
| 6B | 2 (0.25 wt %) | 18.3 | 16.0 | 137 | 11.6 | 86.9 | 0.5854 | 0.0811 | 1.2162 |

Additional polymer compositions were prepared by combining and compounding the constituents, listed below in Table 7, in a 380 cc Banbury mixer, and vulcanized at 160° C. for 20 minutes. Vulcanization process data and physical properties for each elastomeric composition example are provided in Tables 8 and 9.

TABLE 7

Test Formulation

| Compounding | Amount (phr) |
|---|---|
| 1st Stage | |
| Elastomeric Polymer Example (styrene butadiene copolymer) | 80 |
| High cis 1,4-polybutadiene (Buna cis 132-BSL GmbH) | 20 |
| Precipitated silica (Ultrasil 7000 GR, Degussa-Hüls AG) | 80 |
| Silane (NXT silane, Degussa AG) | 9.7 |
| Stearic acid | 1.0 |
| Antiozonant (Dusantox 6 PPD (N-(1,3-dimethyl-butyl)-N'-phenyl-p-phenyllendiamine) Duslo) | 2.0 |
| Zinc oxide | 2.5 |
| Ozone protecting wax (Anitlux 654, Rhein Chemie Rheinau GmbH) | 1.5 |
| Extender oil (aromatic) | 20 |
| 2nd Stage | |
| Sulfur | 1.4 |
| CBS (N-cyclohexyl-2-benzothiazylsulfenamid; Vulcacit CZ/EG, Lanxess AG) | 1.5 |
| DPG (diphenylguanidin, Vulkacit D, Lanxess AG) | 1.5 |

TABLE 8

Compound Properties

| Example | Backbone Modifier | Compound Mooney | TS 1 [min] | TS 2 [min] | TC 50 [min] | TC 90 [min] |
|---|---|---|---|---|---|---|
| 1A | — | 41.1 | 2.93 | 3.65 | 5.24 | 13.50 |
| 2A | 2 (2 wt %) | 109.3 | 0.87 | 1.31 | 2.93 | 14.48 |
| 3B (Ref.) | — | 53.7 | 2.9 | 3.6 | 5.4 | 15.4 |
| 4B | 2 (1 wt %) | 91.7 | 1.3 | 1.9 | 3.5 | 14.8 |
| 5B | 2 (0.5 wt %) | 74.8 | 2.1 | 2.8 | 4.5 | 15.2 |
| 6B | 2 (0.25 wt %) | 62.9 | 2.6 | 3.3 | 5.0 | 15.2 |
| 7C (Ref.) | — | 57.9 | 2.6 | 3.4 | 5.3 | 16.0 |
| 8C | 4 (0.5 wt %) | 64.1 | 2.4 | 3.2 | 4.9 | 14.0 |
| 9D (Ref.) | — | 47.8 | 3.0 | 3.7 | 5.7 | 17.0 |
| 10D | 3 (0.2 wt %) | 52.6 | 2.7 | 3.3 | 5.1 | 15.8 |
| 11D | 3 (0.4 wt %) | 55.6 | 2.3 | 2.9 | 4.7 | 15.6 |
| 9D*(Ref.) | 2 (0.25 wt %) | 55.0 | 2.5 | 3.1 | 4.8 | 15.6 |
| 12E (Ref.) | — | 40.3 | 3.1 | 3.8 | 5.8 | 17.0 |
| 13E | 4 (0.2 wt %) | 47.2 | 3.2 | 4.0 | 3.8 | 4.8 |
| 14E | 4 (0.5 wt %) | 31.0 | 3.5 | 4.4 | 6.6 | 17.2 |
| 15E | 5 (0.5 wt %) | 31.6 | 2.8 | 3.4 | 5.2 | 16.4 |

*The modifier is added directly into the polymer-filler compound and not to the polymer solution.

TABLE 9

Vulcanizate Properties

| Ex | Backbone Modifier | Tensile Strength [MPa] | Modulus 300 [MPa] | DIN Abrasion 0.5 kg load [mm] | Modulus 300 [MPa] | Heat build up [° C.] | Tan δ at 0° C. | Tan δ at 60° C. | Tan δ max |
|---|---|---|---|---|---|---|---|---|---|
| 1A | — | 18.3 | 6.5 | 81 | 6.5 | 136.7 | 0.2293 | 0.1659 | 0.494 |
| 2A | 2 (2 wt %) | 19.2 | 10.4 | 76 | 10.4 | 107.4 | 0.1986 | 0.1137 | 0.580 |
| 3B (Ref.) | — | 18.4 | 8.0 | 97 | 8.0 | 113.7 | 0.2762 | 0.1396 | 0.6781 |
| 4B | 2 (1 wt %) | 20.5 | 11.9 | 100 | 11.9 | 97.7 | 0.2551 | 0.1009 | 0.8517 |
| 5B | 2 (0.5 wt %) | 21.0 | 9.8 | 104 | 9.8 | 104.9 | 0.2690 | 0.1126 | 0.8483 |
| 6B | 2 (0.25 wt %) | 20.9 | 8.8 | 99 | 8.8 | 102.7 | 0.2770 | 0.1195 | 0.8224 |
| 7C (Ref.) | — | 18.2 | 8.0 | 93 | 8.0 | 110.0 | 0.2657 | 0.1310 | 0.7355 |
| 8C | 4 (0.5 wt %) | 20.9 | 8.7 | 97 | 8.7 | 106.1 | 0.2500 | 0.1206 | 0.73368 |

TABLE 9-continued

Vulcanizate Properties

| Ex | Backbone Modifier | Tensile Strength [MPa] | Modulus 300 [MPa] | DIN Abrasion 0.5 kg load [mm] | Modulus 300 [MPa] | Heat build up [° C.] | Tan δ at 0° C. | Tan δ at 60° C. | Tan δ max |
|---|---|---|---|---|---|---|---|---|---|
| 9D (Ref.) | — | 17.3 | 7.2 | N.D. | 7.2 | 115.4 | 0.2708 | 0.1550 | 0.6621 |
| 10D | 3 (0.2 wt %) | 19.5 | 7.5 | 128 | 7.5 | 113.8 | 0.2840 | 0.1487 | 0.6720 |
| 11D | 3 (0.4 wt %) | 17.4 | 8.2 | 123 | 8.2 | 114.4 | 0.2854 | 0.1413 | 0.7152 |
| 9D* (Ref) | 2 (0.25 wt %) | 17.9 | 7.3 | 111 | 7.3 | N.D. | 0.2632 | 0.1443 | 0.6273 |

*The modifier is added directly into the polymer-filler compound

One important application for the subject modified, uncrosslinked elastomeric polymers is their use in preparing cross-linked elastomeric polymer compositions, and specifically tire treads, made therefrom, having low rolling resistance, as represented by compositions having relatively low values for Tan δ at 60° C., with improved wet skid properties, or at least without significant deterioration of wet skid properties, as represented by Tan δ at 0° C. As illustrated in Table 9, m cross-linked elastomeric polymer compositions prepared from uncrosslinked elastomeric polymers, modified according to the present invention (that is with Modifier 2 or with Modifier 3) had lower Tan δ values at 60° C., and relatively stable Tan δ values at 0° C., when compared to their counterpart Examples (designated by the same letter, for example 3B and 4B) prepared without such modification. Additionally, the Tensile Strength, Modulus 300, Tear of the modified Examples were generally improved, or at least not significantly deteriorated. In case of Modifier 3, a significantly increased Tan δ at 0° C. representing an improved wet grip characteristic of the vulcanizate was observed (see examples D9, D10 and D11 in Table 9).

The Examples of the invention demonstrate that there is no need for additional additives, such as, for example, a radical forming initiator compound, fostering the backbone modification reaction. Beneficially, the modification process is kept relatively simple, and requires only the homogeneous distribution of the backbone modifier compound in the polymer solution. Therefore, in comparison with a chain-end modification, no extra process time must be taken into account for a chemical reaction of the modifier compound with the polymer backbone. The backbone modification reaction occurs in process steps, following the modifier addition (for example, polymer work up, compounding and/or vulcanization), without requiring extra process time, and without essentially causing changes of the typical process steps. Beneficially, the backbone modification reaction can be performed in addition to any other polymer modification reaction, such as, for example, but not limited to, a typical polymer chain-end modification. For example, non-modified polymer containing vulcanizate 1A can be compared with vulcanizate 2A, representing a backbone modifier containing polymer without chain-end modification. Alternatively, for example chain-end-modified polymer containing vulcanizate 9D can be compared with vulcanizate 11D, representing a backbone modifier containing chain-end modified polymer. It is an advantage that the combination of two modification pathways, such as the combination of a chain-end modification with a backbone modification leads to an enhancement of vulcanizate properties, such as Rolling Resistance, Tensile Strength, Modulus 300, and Tear.

It is important that the subject uncrosslinked elastomeric polymers are modified with the subject modifiers after the uncrosslinked elastomeric polymers have been polymerized and terminated rather than simply adding the modifier to the polymer-filler composition during the compounding step. More specifically, as shown by the data in Table 9, the addition of Modifier 2 as such (example 9D*) to the polymer-filler composition had very little impact on the values of Tan δ at 60° C. of the resulting vulcanizate, while the Tan δ at 0° C. value declined corresponding to a deteriorated wet grip compound vulcanizate property.

As shown in Table 9, heat build up during dynamic deformation is reduced by use of the subject modified uncrosslinked elastomeric polymers. This reduction is believed to improve the durability of the resulting composition due to an increased overall elasticity. Similarly, Tensile Strength and Modulus 300 are improved, suggesting the formation of a stable polymer network and polymer-filler contacts leading to a higher resistance under mechanical stress.

Examples 5B and 6B in Tables 5 and 8 show that scorch times (TS) and times to cure (TC) are still in the range defined by the unmodified polymers, and have good processability when low backbone modifier concentrations are chosen.

Examples 10D and 11D in Table 3 show that the modifier agent of the invention does not lead to gel formation, and still results in above discussed vulcanizate property improvements.

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A composition comprising a polymer formed from a first composition comprising:
   i) an uncrosslinked elastomeric polymer, and
   ii) a sulfide modifier represented by Formula 1:

$$AS\text{—}Y\text{-}Zm \quad \text{(Formula 1), and}$$

wherein
   Y is ($C_{12}$-$C_{100}$) aralkyl, ($C_{12}$-$C_{100}$) aryl, ($C_{12}$-$C_{100}$)alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, or thioalkyl;
   S is sulfur;
   A is hydrogen, —(S)$_p$—R1 or -MR2R3R4;
   Z is —SH, —S-MR5R6R7, —S—(S)$_p$—R8, —NR9R10, —NR11COR12, —O—CO—R13, —NCO, or —COOR14;

M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

2. The composition of claim 1, wherein
Y is ($C_{12}$-$C_{100}$) alkyl, ($C_{12}$-$C_{100}$) aralkyl, or ($C_{12}$-$C_{100}$) aryl;
A is hydrogen, —(S)$_p$—R1 or —SiR2R3R4;
Z is —SH, —S—SiR2R3R4, —S—(S)$_p$—R8, —NR9R10, —NR11COR12, or —COOR14;
m is the number one R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri (hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

3. The composition of claim 1, wherein the uncrosslinked elastomeric polymer comprises a chemical moiety derived from at least one coupling agent selected from the group consisting of tin halide, tin alkoxide, silicon halide, and silicon alkoxide.

4. The composition of claim 1, further comprising a polystyrene.

5. The composition of claim 2, further comprising a polystyrene.

6. The composition of claim 1, further comprising a butadiene/acrylonitrile copolymer with an acrylonitrile unit content from 5 to 60 weight percent, based on the weight of the copolymer, and wherein the butadiene/acrylonitrile copolymer is partially hydrogenated or fully hydrogenated.

7. The composition of claim 2, further comprising a butadiene/acrylonitrile copolymer with an acrylonitrile unit content from 5 to 60 weight percent, based on the weight of the copolymer, and wherein the butadiene/acrylonitrile copolymer is partially hydrogenated or fully hydrogenated.

8. The composition of claim 3, further comprising a butadiene/acrylonitrile copolymer with an acrylonitrile unit content from 5 to 60 weight percent, based on the weight of the copolymer, and wherein the butadiene/acrylonitrile copolymer is partially hydrogenated or fully hydrogenated.

9. The composition of claim 1, wherein the elastomeric polymer is selected from at least one of isoprene homopolymers, isoprene copolymers, isoprene terpolymers, butadiene homopolymers, butadiene copolymers, butadiene terpolymers, butadiene-styrene copolymers or butadiene-styrene terpolymers.

10. A crosslinked composition comprising an elastomeric polymer formed from a second composition comprising:
1) a filler;
2) a vulcanization agent; and
3) a modified polymer, which is formed from a first composition comprising:
i) an uncrosslinked elastomeric polymer, and
ii) a sulfide modifier represented by the Formula 1:

$$AS—Y-Zm \quad \text{(Formula 1), and}$$

wherein
Y is ($C_{12}$-$C_{100}$) aralkyl, ($C_{12}$-$C_{100}$) aryl, ($C_{12}$-$C_{100}$) alkyl and ($C_{12}$-$C_{100}$) dialkylether (alkyl-O-alkyl), and wherein each which may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, NO$_2$, alkoxy, or thioalkyl;
S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, —COOR14;
M is silicon or tin;
N is nitrogen;
O is oxygen;
m is the number one, two or three;
p is the number one, two, three, four or five; and
R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each, independently, selected from ($C_1$-$C_{16}$) alkyl, ($C_6$-$C_{16}$) aryl, or ($C_7$-$C_{16}$) aralkyl.

11. The composition of claim 10, wherein
Y is ($C_{12}$-$C_{100}$) alkyl, ($C_{12}$-$C_{100}$) aralkyl, or ($C_{12}$-$C_{100}$) aryl;
A is hydrogen, —(S)$_p$—R1 or —SiR2R3R4;
Z is —SH, —S—SiR2R3R4, —S—(S)$_p$—R8, —NR9R10, —NR11COR12, or —COOR14; and
R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each, independently, selected from ($C_1$-$C_{16}$) alkyl, ($C_6$-$C_{16}$) aryl, or ($C_7$-$C_{16}$) aralkyl.

12. A tire tread comprising the composition of claim 10.

13. A modified polymer formed from a composition comprising:
i) an uncrosslinked elastomeric polymer, and
ii) a sulfide modifier, represented by the Formula 1:

$$AS—Y-Zm \quad \text{(Formula 1), and}$$

wherein
Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether (alkyl-O-alkyl), and wherein each may be optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, NO$_2$, alkoxy, or thioalkyl;
S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen;
m is the number one, two or three;
p is the number one, two, three, four or five;
R1, R2, R3, R4, R5, R6, R7, R8, R9, R10, R11, R12, R13 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

14. The polymer of claim 13, wherein
Y is ($C_{12}$-$C_{100}$) alkyl, ($C_{12}$-$C_{100}$) aralkyl, or ($C_{12}$-$C_{100}$) aryl;
A is hydrogen, —(S)$_p$—R1 or —SiR2R3R4;
Z is —SH, —S—SiR2R3R4, —S—(S)$_p$—R8, —NR9R10, —NR11COR12, or —COOR14;

R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

15. The polymer of claim 13, wherein the composition further comprises at least one coupling agent selected from tin halide, tin alkoxide, silicon halide, or silicon alkoxide.

16. The composition of claim 1, wherein the uncrosslinked elastomeric polymer is prepared from a mixture comprising at least one coupling agent selected from tin halide, tin alkoxide, silicon halide, or silicon alkoxide.

17. An article comprising at least one component formed from the composition of claim 1.

18. The article of claim 17, wherein the article is selected from the group consisting of a tire component, an automotive part, a footwear component, a belt, a gasket, a seal, and a hose.

19. An article comprising at least one component formed from the polymer of claim 13.

20. The article of claim 19, wherein the article is selected from the group consisting of a tire component, an automotive part, a footwear component, a belt, a gasket, a seal, and a hose.

* * * * *